United States Patent

Cochran

(10) Patent No.: US 7,058,850 B2
(45) Date of Patent: Jun. 6, 2006

(54) METHOD AND SYSTEM FOR PREVENTING DATA LOSS WITHIN DISK-ARRAY PAIRS SUPPORTING MIRRORED LOGICAL UNITS

(75) Inventor: Robert A. Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 574 days.

(21) Appl. No.: 10/210,368

(22) Filed: Jul. 31, 2002

(65) Prior Publication Data

US 2004/0078638 A1   Apr. 22, 2004

(51) Int. Cl.
   *G06F 11/00*   (2006.01)
(52) U.S. Cl. .................. 714/6; 714/4; 714/43
(58) Field of Classification Search .......... 714/6, 714/43, 4, 42
   See application file for complete search history.

(56) References Cited

U.S. PATENT DOCUMENTS

| | | | |
|---|---|---|---|
| 6,543,001 B1 * | 4/2003 | LeCrone et al. | 714/6 |
| 6,587,970 B1 * | 7/2003 | Wang et al. | 714/47 |
| 6,691,245 B1 * | 2/2004 | DeKoning | 714/6 |
| 6,728,898 B1 * | 4/2004 | Tremblay et al. | 714/6 |
| 6,785,678 B1 * | 8/2004 | Price | 707/8 |
| 6,816,951 B1 * | 11/2004 | Kimura et al. | 711/162 |
| 2002/0099916 A1 * | 7/2002 | Ohran et al. | 711/162 |

* cited by examiner

*Primary Examiner*—Robert Beausoliel
*Assistant Examiner*—Christopher McCarthy

(57) ABSTRACT

An additional communications link between two mass-storage devices containing LUNs of a mirrored-LUN pair, as well as incorporation of a fail-safe mass-storage-device-implemented retry protocol to facilitate non-drastic recovery from communications link failures within the controllers of the two mass-storage devices, prevents build-up of WRITE requests in cache and subsequent data loss due to multiple communications-link and host computer failures. The combination of the additional link and the retry protocol together ameliorates a deficiency in current LUN-mirroring implementations that often leads to data loss and inconsistent and unrecoverable databases.

12 Claims, 22 Drawing Sheets

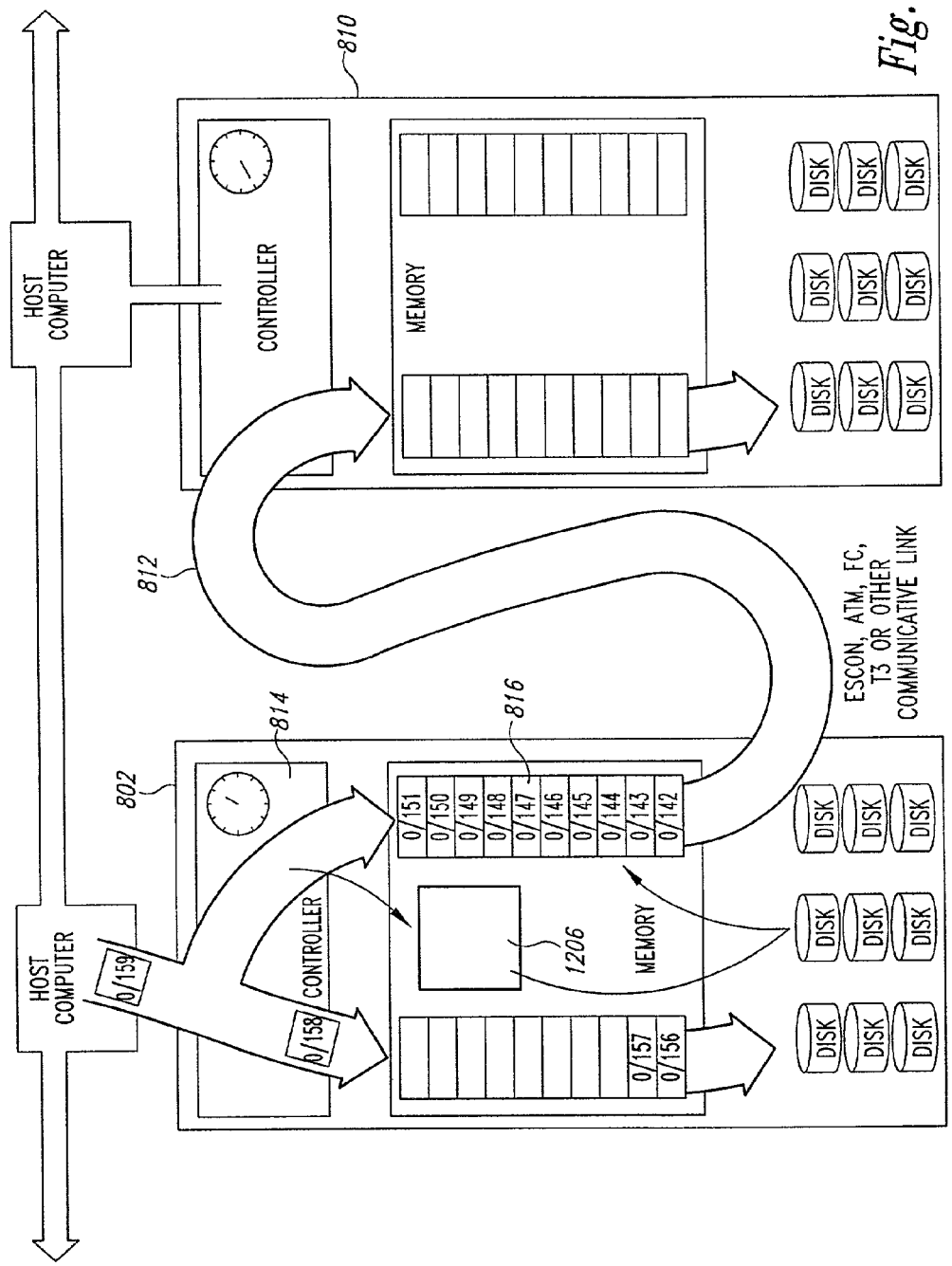

METHOD AND SYSTEM FOR PREVENTING DATA LOSS WITHIN DISK-ARRAY PAIRS SUPPORTING MIRRORED LOGICAL UNITS

TECHNICAL FIELD

The present invention relates to the mirroring of logical units provided by disk arrays and other multi-logical-unit mass-storage devices and, in particular, to a method and system for preventing data loss resulting from host-computer and communications-link failures that interrupt data flow between a primary, or dominant, logical unit on a first mass-storage device and a secondary, remote-mirror logical unit on a second mass-storage device.

BACKGROUND OF THE INVENTION

The present invention is related to mirroring of data contained in a dominant logical unit of a first mass-storage device to a remote-mirror logical unit provided by a second mass-storage device. An embodiment of the present invention, discussed below, involves disk-array mass-storage devices. To facilitate that discussion, a general description of disk drives and disk arrays is first provided.

The most commonly used non-volatile mass-storage device in the computer industry is the magnetic disk drive. In the magnetic disk drive, data is stored in tiny magnetized regions within an iron-oxide coating on the surface of the disk platter. A modern disk drive comprises a number of platters horizontally stacked within an enclosure. The data within a disk drive is hierarchically organized within various logical units of data. The surface of a disk platter is logically divided into tiny, annular tracks nested one within another. FIG. 1A illustrated tracks on the surface of a disk platter. Note that, although only a few tracks are shown in FIG. 1A, such as track 101, an actual disk platter may contain many thousands of tracks. Each track is divided into radial sectors. FIG. 1B illustrates sectors within a single track on the surface of the disk platter. Again, a given disk track on an actual magnetic disk platter may contain many tens or hundreds of sectors. Each sector generally contains a fixed number of bytes. The number of bytes within a sector is generally operating-system dependent, and normally ranges from 512 bytes per sector to 4096 bytes per sector. The data normally retrieved from, and stored to, a hard disk drive is in units of sectors.

The modern disk drive generally contains a number of magnetic disk platters aligned in parallel along a spindle passed through the center of each platter. FIG. 2 illustrates a number of stacked disk platters aligned within a modern magnetic disk drive. In general, both surfaces of each platter are employed for data storage. The magnetic disk drive generally contains a comb-like array with mechanical READ/WRITE heads 201 that can be moved along a radial line from the outer edge of the disk platters toward the spindle of the disk platters. Each discrete position along the radial line defines a set of tracks on both surfaces of each disk platter. The set of tracks within which ganged READ/WRITE heads are positioned at some point along the radial line is referred to as a cylinder. In FIG. 2, the tracks 202–210 beneath the READ/WRITE heads together comprise a cylinder, which is graphically represented in FIG. 2 by the dashed-out lines of a cylinder 212.

FIG. 3 is a block diagram of a standard disk drive. The disk drive 301 receives input/output ("I/O") requests from remote computers via a communications medium 302 such as a computer bus, fibre channel, or other such electronic communications medium. For many types of storage devices, including the disk drive 301 illustrated in FIG. 3, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 302 to a remote computer, and as a result of a WRITE operation, data is received from a remote computer by the storage device via communications medium 302 and stored within the storage device.

The disk drive storage device illustrated in FIG. 3 includes controller hardware and logic 303 including electronic memory, one or more processors or processing circuits, and controller firmware, and also includes a number of disk platters 304 coated with a magnetic medium for storing electronic data. The disk drive contains many other components not shown in FIG. 3, including READ/WRITE heads, a high-speed electronic motor, a drive shaft, and other electronic, mechanical, and electromechanical components. The memory within the disk drive includes a request/reply buffer 305, which stores I/O requests received from remote computers, and an I/O queue 306 that stores internal I/O commands corresponding to the I/O requests stored within the request/reply buffer 305. Communication between remote computers and the disk drive, translation of I/O requests into internal I/O commands, and management of the I/O queue, among other things, are carried out by the disk drive I/O controller as specified by disk drive I/O controller firmware 307. Translation of internal I/O commands into electromechanical disk operations in which data is stored onto, or retrieved from, the disk platters 304 is carried out by the disk drive I/O controller as specified by disk media read/write management firmware 308. Thus, the disk drive I/O control firmware 307 and the disk media read/write management firmware 308, along with the processors and memory that enable execution of the firmware, compose the disk drive controller.

Individual disk drives, such as the disk drive illustrated in FIG. 3, are normally connected to, and used by, a single remote computer, although it has been common to provide dual-ported disk drives for concurrent use by two computers and multi-host-accessible disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 3, into a disk array device, increasing both the storage capacity as well as increasing the capacity for parallel I/O request servicing by concurrent operation of the multiple disk drives contained within the disk array.

FIG. 4 is a simple block diagram of a disk array. The disk array 402 includes a number of disk drive devices 403, 404, and 405. In FIG. 4, for simplicity of illustration, only three individual disk drives are shown within the disk array, but disk arrays may contain many tens or hundreds of individual disk drives. A disk array contains a disk array controller 406 and cache memory 407. Generally, data retrieved from disk drives in response to READ requests may be stored within the cache memory 407 so that subsequent requests for the same data can be more quickly satisfied by reading the data from the quickly accessible cache memory rather than from the much slower electromechanical disk drives. Various elaborate mechanisms are employed to maintain, within the cache memory 407, data that has the greatest chance of being subsequently re-requested within a reasonable amount of time. The disk WRITE requests, in cache memory 407, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass-storage devices other than hard disks, or combinations of memory, hard disks, and/or other types of mass-storage devices. Remote computers generally access data within a disk array through one of the many abstract LUNs 408–415 provided by the disk array via internal disk drives 403–405 and the disk array controller 406. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass-storage device, such as a disk array, a primary data object, such as a file or database, is normally backed up to backup copies of the primary data object on physically discrete mass-storage devices or media so that if, during operation of the application or system, the primary data object becomes corrupted, inaccessible, or is overwritten or deleted, the primary data object can be restored by copying a backup copy of the primary data object from the mass-storage device. Many different techniques and methodologies for maintaining backup copies have been developed. In one well-known technique, a primary data object is mirrored. FIG. 5 illustrates object-level mirroring. In FIG. 5, a primary data object "$O_3$" 501 is stored on LUN A 502. The mirror object, or backup copy, "$O_3$" 503 is stored on LUN B 504. The arrows in FIG. 5, such as arrow 505, indicate I/O write operations directed to various objects stored on a LUN. I/O write operations directed to object "$O_3$" are represented by arrow 506. When object-level mirroring is enabled, the disk array controller providing LUNs A and B automatically generates a second I/O write operation from each I/O write operation 506 directed to LUN A, and directs the second generated I/O write operation via path 507, switch "$S_1$" 508, and path 509 to the mirror object "$O_3$" 503 stored on LUN B 504. In FIG. 5, enablement of mirroring is logically represented by switch "$S_1$" 508 being on. Thus, when object-level mirroring is enabled, any I/O write operation, or any other type of I/O operation that changes the representation of object "$O_3$" 501 on LUN A, is automatically mirrored by the disk array controller to identically change the mirror object "$O_3$" 503. Mirroring can be disabled, represented in FIG. 5 by switch "$S_1$" 508 being in an off position. In that case, changes to the primary data object "$O_3$" 501 are no longer automatically reflected in the mirror object "$O_3$" 503. Thus, at the point that mirroring is disabled, the stored representation, or state, of the primary data object "$O_3$" 501 may diverge from the stored representation, or state, of the mirror object "$O_3$" 503. Once the primary and mirror copies of an object have diverged, the two copies can be brought back to identical representations, or states, by a resync operation represented in FIG. 5 by switch "$S_2$" 510 being in an on position. In the normal mirroring operation, switch "$S_2$" 510 is in the off position. During the resync operation, any I/O operations that occurred after mirroring was disabled are logically issued by the disk array controller to the mirror copy of the object via path 511, switch "$S_2$," and pass 509. During resync, switch "$S_1$" is in the off position. Once the resync operation is complete, logical switch "$S_2$" is disabled and logical switch "$S_1$" 508 can be turned on in order to reenable mirroring so that subsequent I/O write operations or other I/O operations that change the storage state of primary data object "$O_3$," are automatically reflected to the mirror object "$O_3$" 503.

FIG. 6 illustrates a dominant LUN coupled to a remote-mirror LUN. In FIG. 6, a number of computers and computer servers 601–608 are interconnected by various communications media 610–612 that are themselves interconnected by additional communications media 613–614. In order to provide fault tolerance and high availability for a large data set stored within a dominant LUN on a disk array 616 coupled to server computer 604, the dominant LUN 616 is mirrored to a remote-mirror LUN provided by a remote disk array 618. The two disk arrays are separately interconnected by a dedicated communications medium 620. Note that the disk arrays may be linked to server computers, as with disk arrays 616 and 618, or may be directly linked to communications medium 610. The dominant LUN 616 is the target for READ, WRITE, and other disk requests. All WRITE requests directed to the dominant LUN 616 are transmitted by the dominant LUN 616 to the remote-mirror LUN 618, so that the remote-mirror LUN faithfully mirrors the data stored within the dominant LUN. If the dominant LUN fails, the requests that would have been directed to the dominant LUN can be redirected to the mirror LUN without a perceptible interruption in request servicing. When operation of the dominant LUN 616 is restored, the dominant LUN 616 may become the remote-mirror LUN for the previous remote-mirror LUN 618, which becomes the new dominant LUN, and may be resynchronized to become a faithful copy of the new dominant LUN 618. Alternatively, the restored dominant LUN 616 may be brought up to the same data state as the remote-mirror LUN 618 via data copies from the remote-mirror LUN and then resume operating as the dominant LUN. Various types of dominant-LUN/remote-mirror-LUN pairs have been devised. Some operate entirely synchronously, while others allow for asynchronous operation and reasonably slight discrepancies between the data states of the dominant LUN and mirror LUN.

Unfortunately, interruptions in the direct communications between disk arrays containing a dominant LUN and a remote-mirror LUN of a mirrored LUN pair occur relatively frequently. Currently, when communications are interrupted or suffer certain types of failures, data may end up languishing in cache-memory buffers, and, in the worst cases, purged from cache-memory buffers or lost due to systems failures. Designers and manufacturers of mass-storage devices, such as disk arrays, and users of mass-storage devices and high-availability and fault-tolerant systems that employ mass-storage devices, have recognized the need for a more reliable LUN-mirroring technique and system that can weather communications failures and host-computer failures.

SUMMARY OF THE INVENTION

One embodiment of the present invention provides an additional communications link between two mass-storage devices containing LUNs of a mirror-LUN pair, as well as incorporating a fail-safe, mass-storage-device-implemented retry protocol to facilitate non-drastic recovery from communications-link failures. The additional communications link between the two mass-storage devices greatly reduces the likelihood of the loss of buffered data within the mass-storage device containing the dominant LUN of a mirrored LUN pair, and the retry protocol prevents unnecessary build-up of data within cache-memory buffers of the mass-storage device containing the remote-mirror LUN. The combination of the additional communications link and retry protocol together ameliorates a deficiency in current LUN-mirroring implementations that leads to data loss and inconsistent and unrecoverable databases. The additional communications link provided by the present invention is physically distinct and differently implemented from the direct communications link between the two mass-storage devices, to provide greater robustness in the event of major hardware failure.

BRIEF DESCRIPTION OF THE DRAWINGS

FIGS. 12A–C illustrates an error-recovery technique employed to handle communications-link failures.

DETAILED DESCRIPTION OF THE INVENTION

One embodiment of the present invention provides a more communications-fault-tolerant mirroring technique that prevents loss of data stored in electronic cache-memory for relatively long periods of time due to host-computer failures and communications failures. In the discussion below, the data-loss problems are described, in detail, followed by a description of an enhanced mass-storage-device pair and an enhanced high-level communications protocol implemented in the controllers of the mass-storage-devices.

Figure 1A:
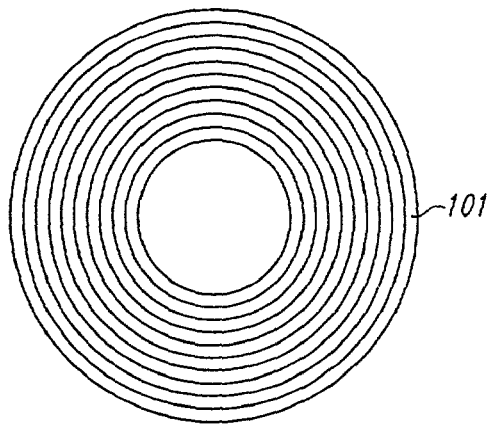
FIG. 1A illustrated tracks on the surface of a disk platter.
Figure 1B:
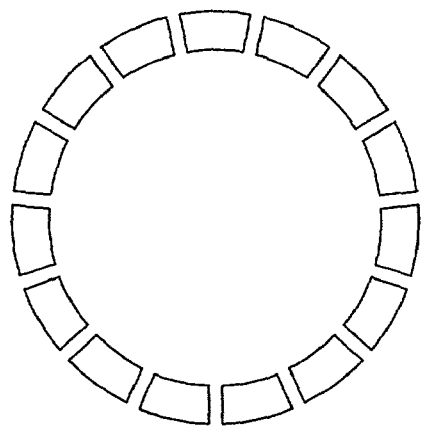
FIG. 1B illustrates sectors within a single track on the surface of the disk platter.
Figure 2:
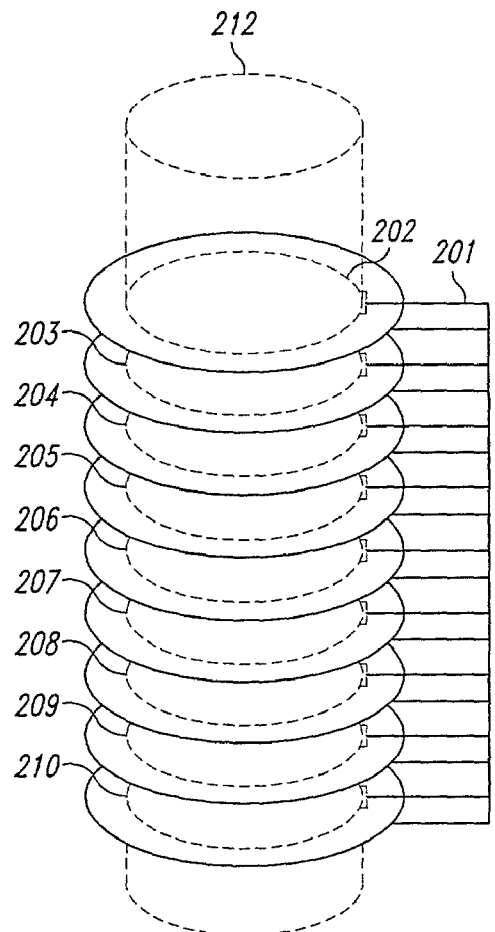
FIG. 2 illustrates a number of disk platters aligned within a modern magnetic disk drive.
Figure 3:
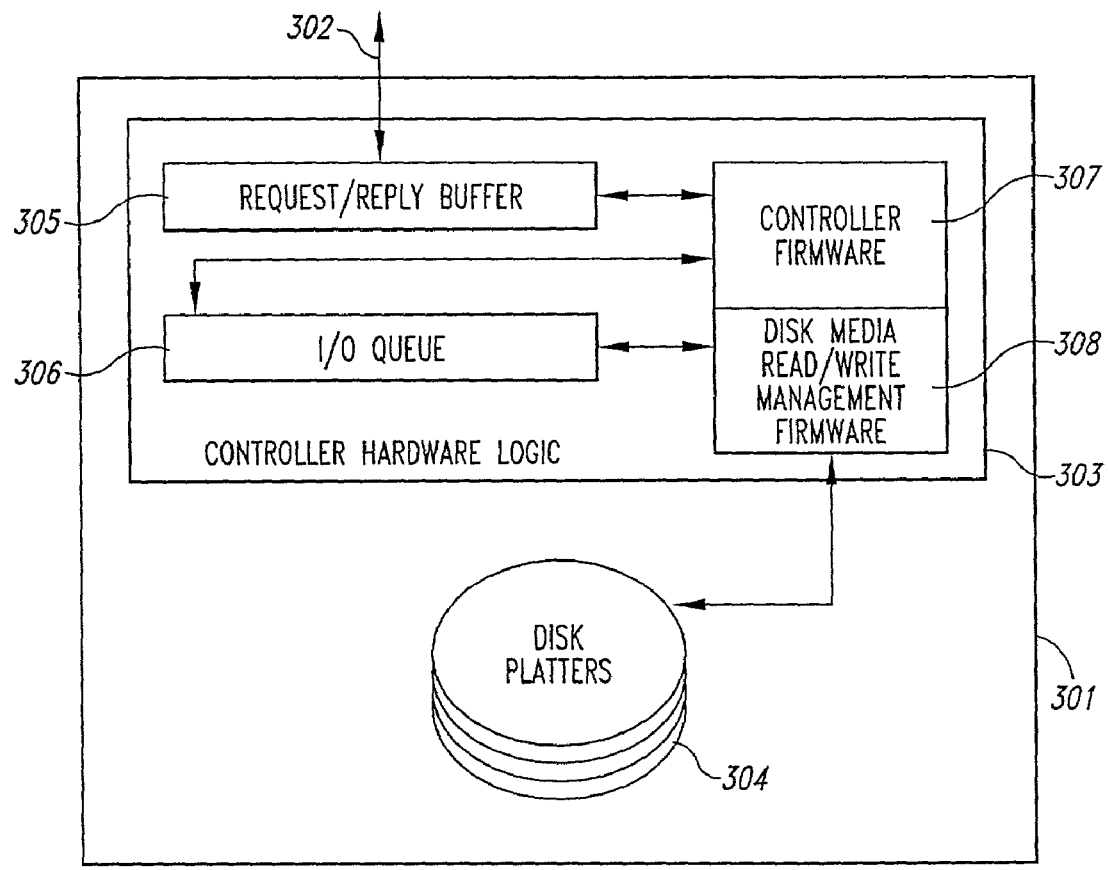
FIG. 3 is a block diagram of a standard disk drive.
Figure 4:
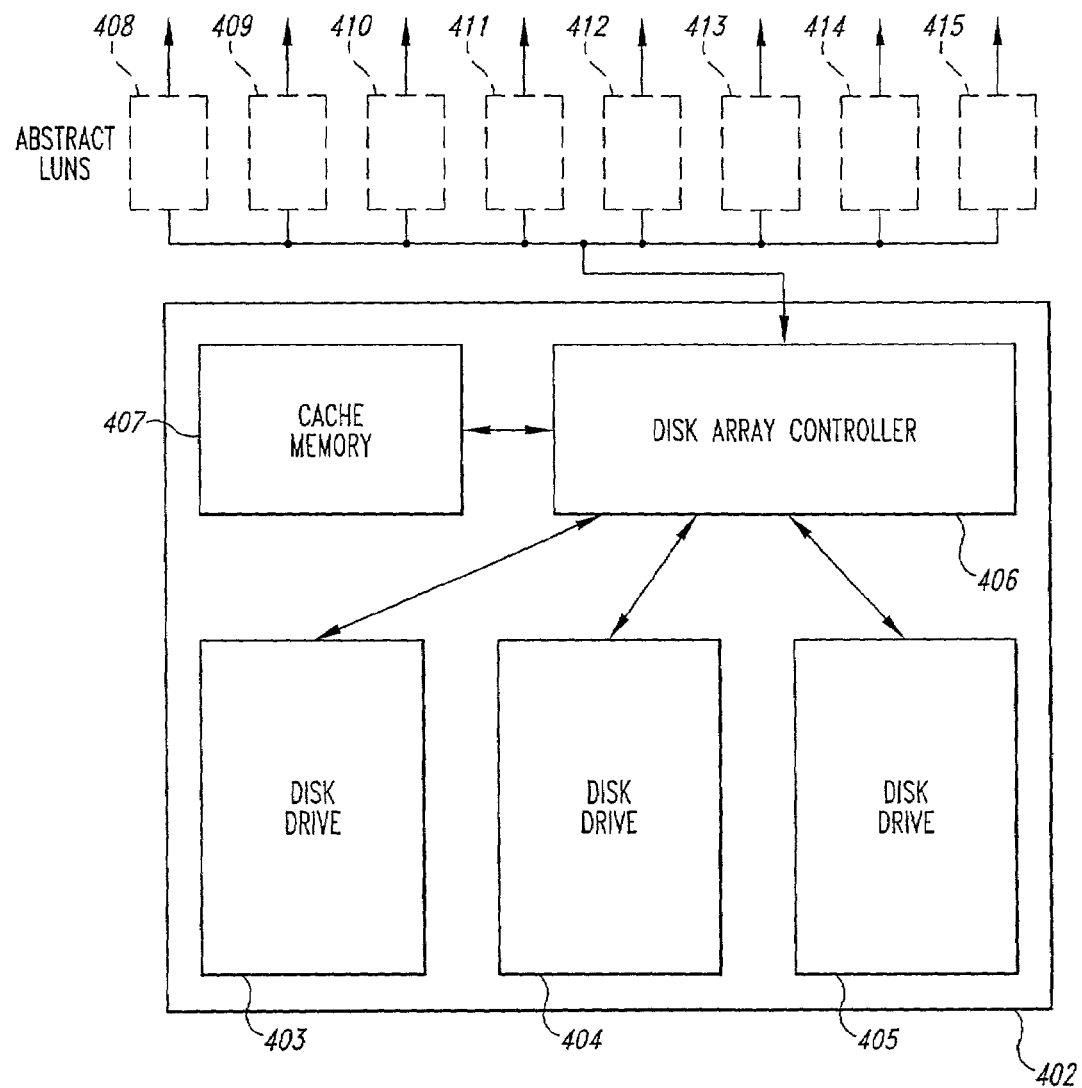
FIG. 4 is a simple block diagram of a disk array.
Figure 5:
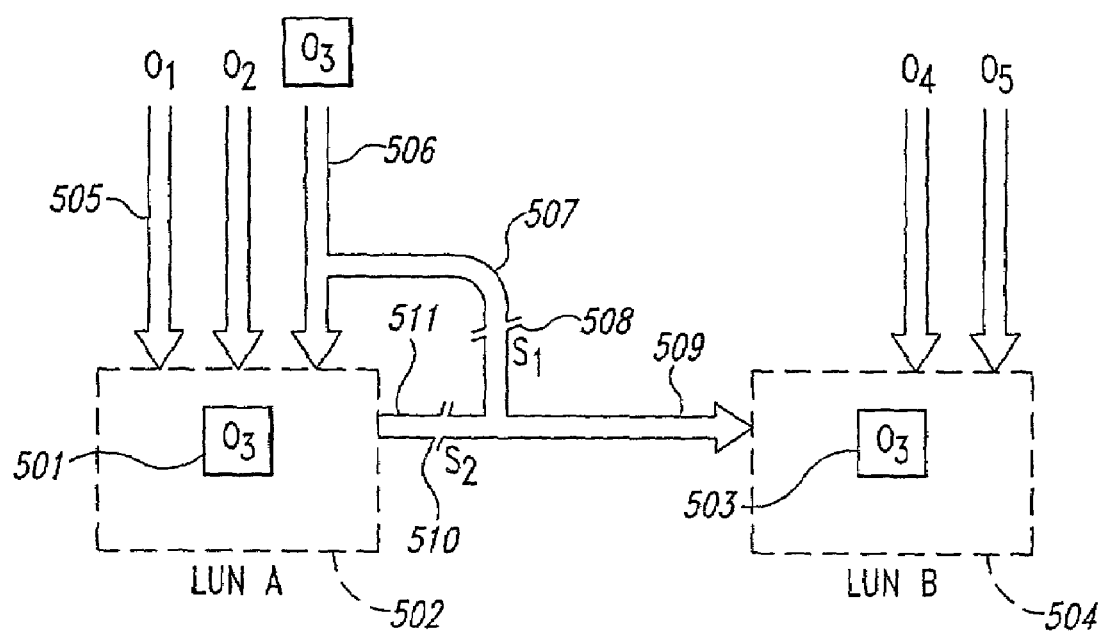
FIG. 5 illustrates object-level mirroring.
Figure 6:
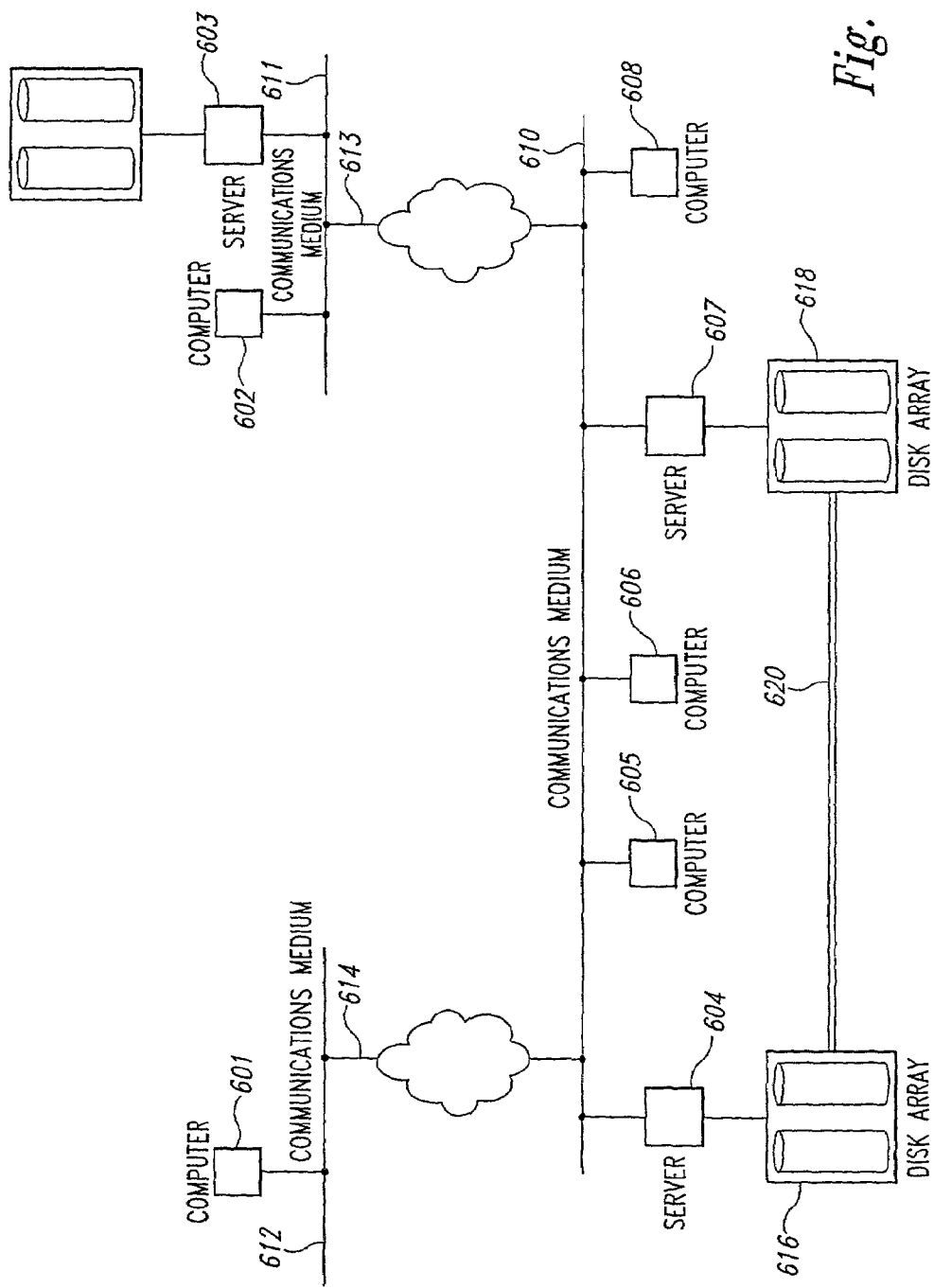
FIG. 6 illustrates a dominant logical unit coupled to a remote-mirror logical unit.
Figure 7:
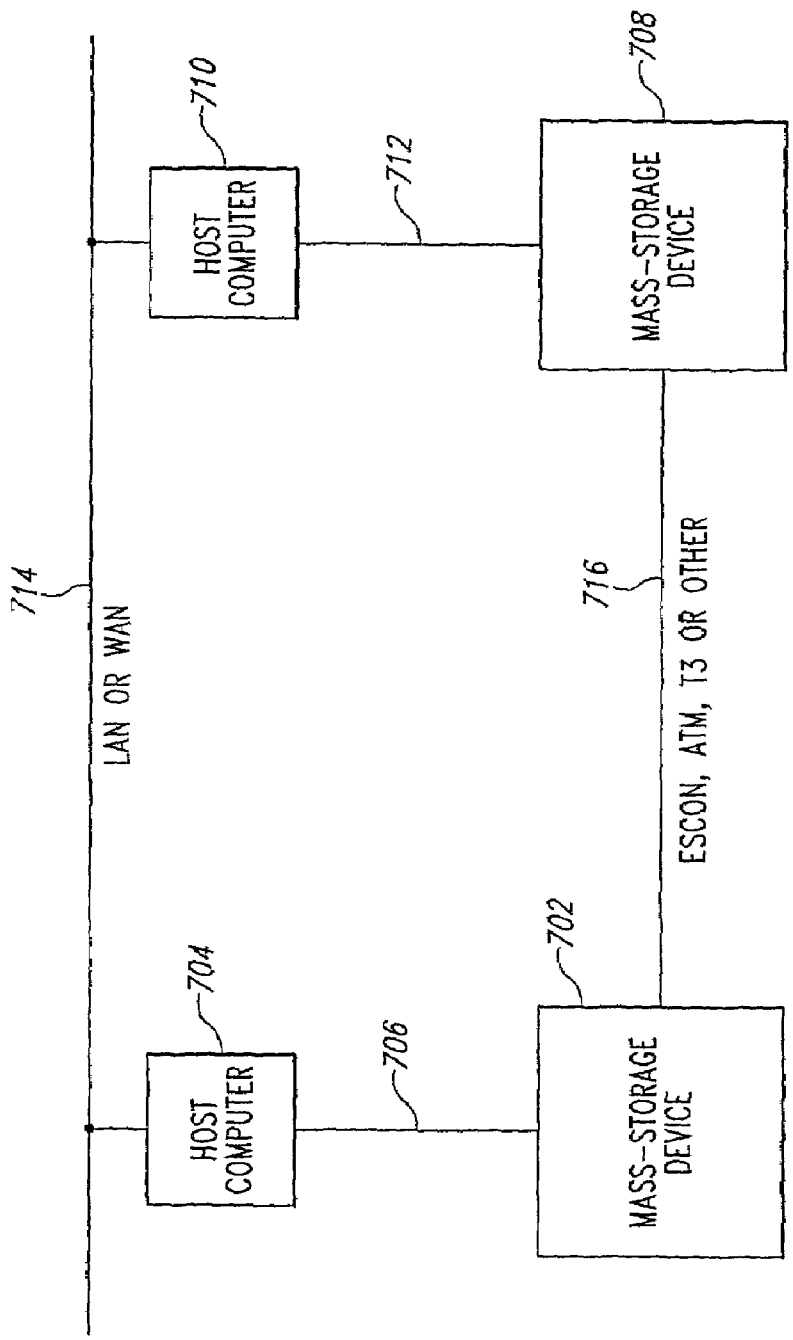
FIG. 7 shows an abstract representation of the communications-link topography currently employed for interconnecting mass-storage devices containing the dominant and remote-mirror logical units of a mirrored-logical-unit pair.

FIG. 7 shows an abstract representation of the communications-link topography currently employed for interconnecting mass-storage devices containing the dominant and remote-mirror LUNs of a mirrored-LUN pair. A first mass-storage device 702 is interconnected with a first host computer 704 via a small-computer-systems interface ("SCSI"), fiber-channel ("FC"), or other type of communications link 706. A second mass-storage device 708 is interconnected with a second host computer 710 via a second SCSI or FC communications link 712. The two host computers are interconnected via a local-area network ("LAN") or wide-area network ("WAN") 714. The two mass-storage devices 702 and 708 are directly interconnected, for purposes of mirroring, by one or more dedicated enterprise systems connection ("ESCON"), asynchronous transfer mode ("ATM"), FC, T3, or other types of links 716. The first mass-storage device 702 contains a dominant LUN of a mirrored-LUN pair, while the second mass-storage device 708 contains the remote-mirror LUN of the mirrored-LUN pair.

Figure 8A:
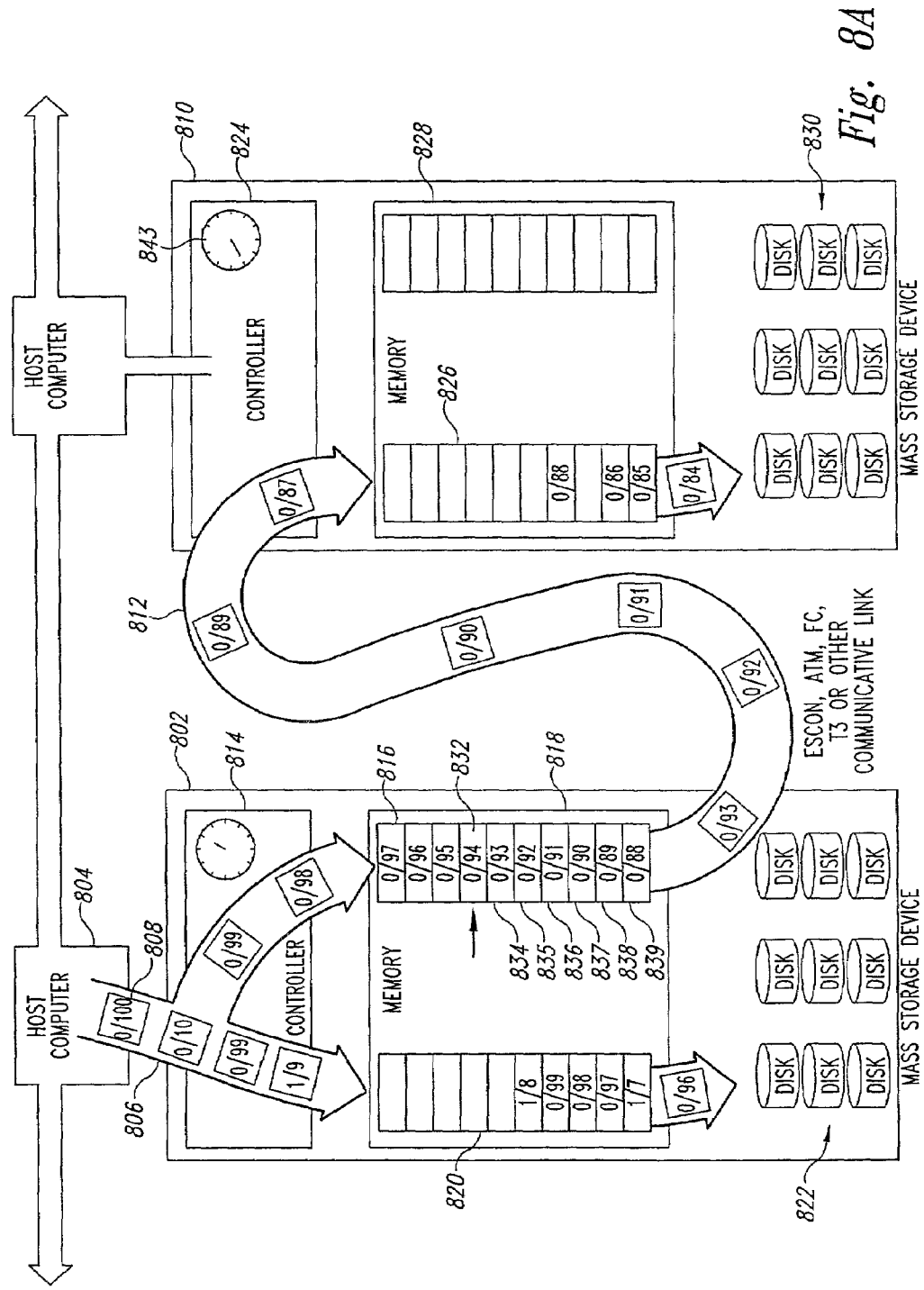
FIGS. 8A–C illustrates a communications-link failure that results in purging of the cache memory within the mass-storage device containing a remote-mirror logical unit.
Figure 8B:
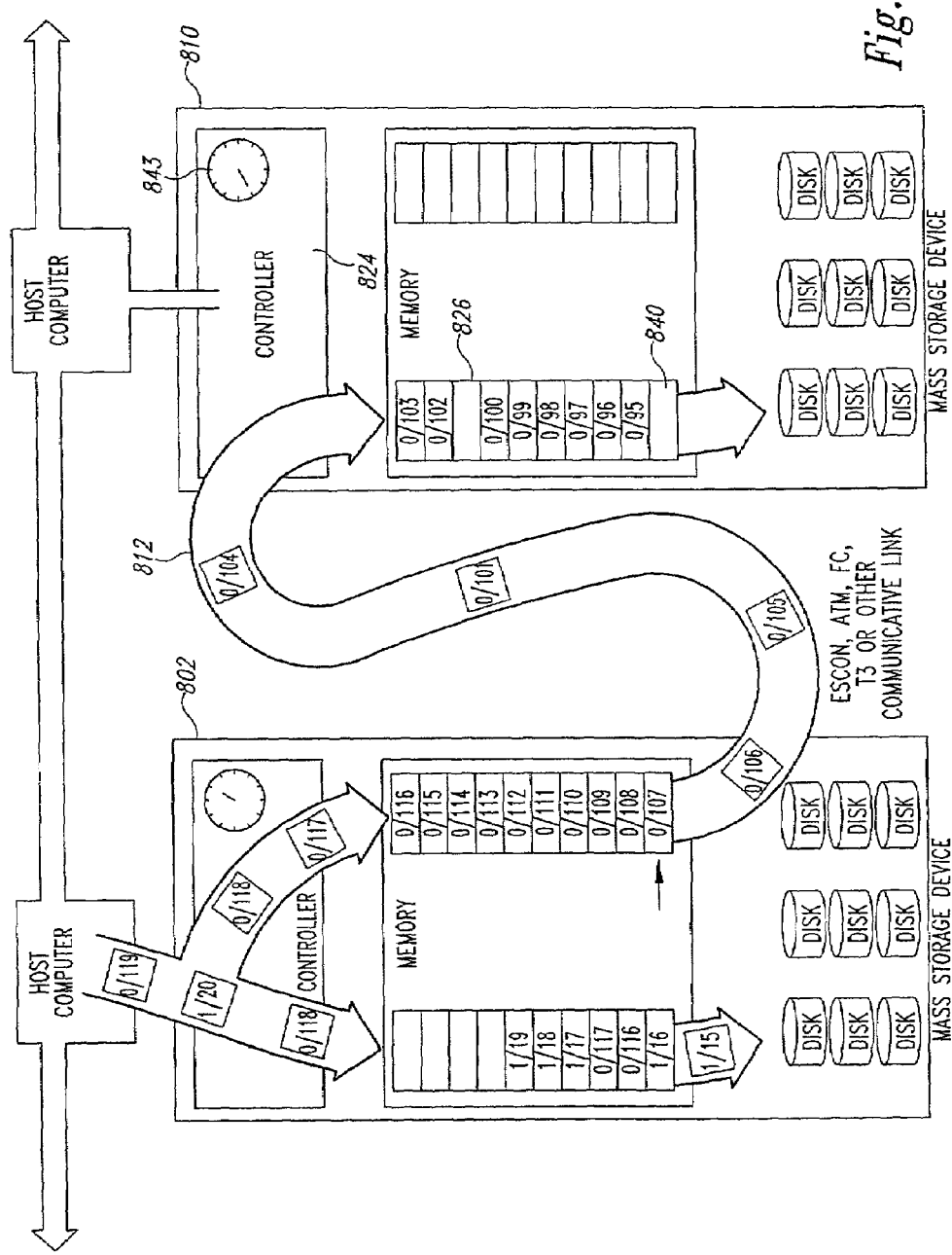
Figure 8C:
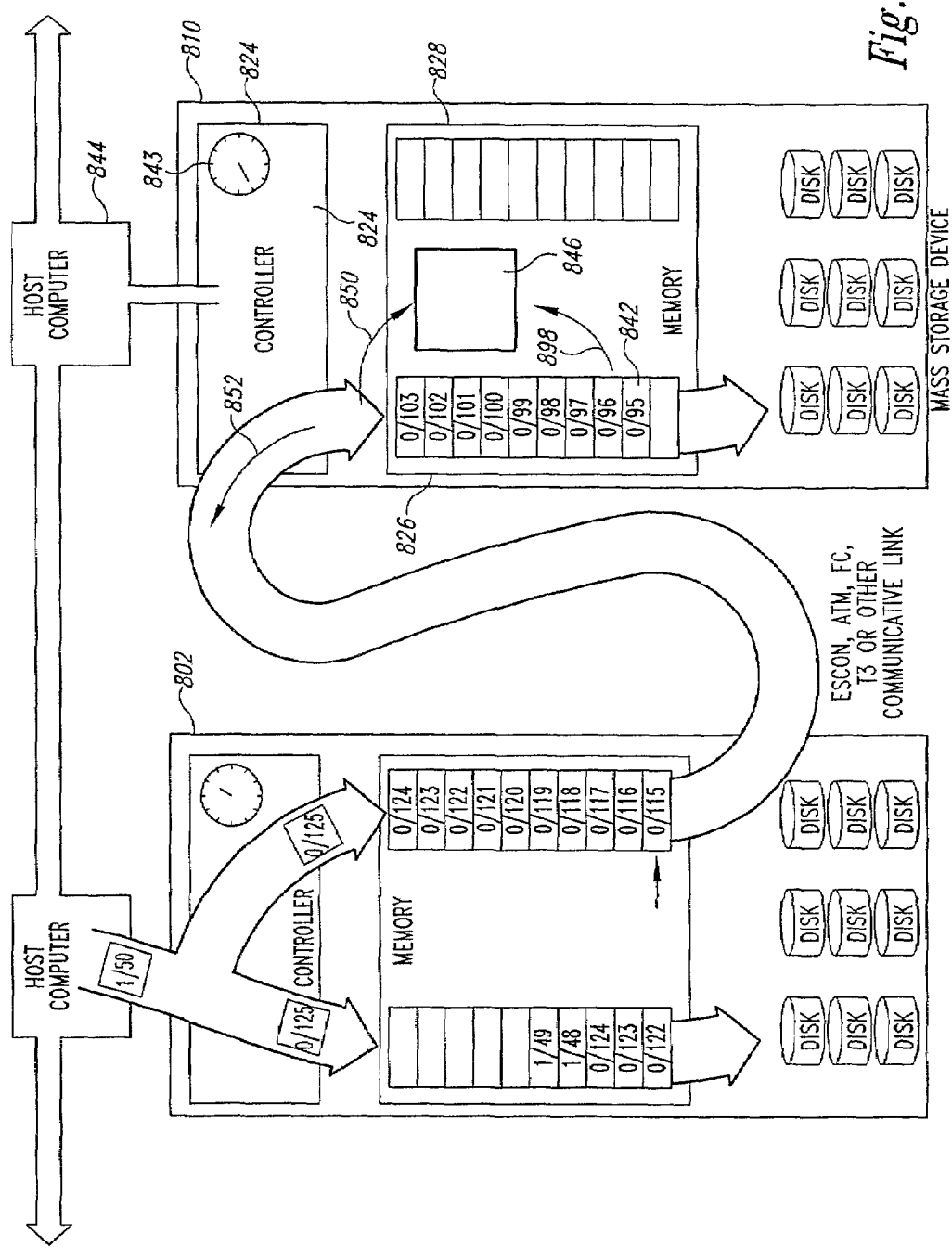

FIGS. 8A–C illustrates a communications-link failure that leads to a purge of cache memory within the mass-storage device containing a remote-mirror LUN. In FIG. 8A, data to be written to physical-data-storage devices within a first mass-storage device 802 is transmitted by a host computer 804 through a SCSI, FC, or other type of link 806 to the mass-storage device 802. In FIGS. 8A–C, and in FIGS. 11A–D, 12, 13, and 15A–D, which employ similar illustration conventions as employed in FIGS. 8A–C, incoming WRITE commands are illustrated as small square objects, such as incoming WRITE command 808, within a communications path such as the SCSI, FC, or other type of link 806. Each WRITE request contains a volume or LUN number followed a "slash," followed in turn, by a sequence number. WRITE requests are generally sequenced by high-level protocols so that WRITE requests can be applied, in order, to the database contained within volumes or LUNs stored on one or more physical data-storage devices. For example, both in FIGS. 8A–C and in the subsequent figures, identified above, LUN "0" is mirrored to a remote mirror stored within physical data-storage devices of a second mass-storage device 810, interconnected with the first mass-storage device 802 by one or more ESCON, ATM, FC, T3, or other type of communications links 812.

The controller 814 of the first mass-storage device 802 detects WRITE requests directed to dominant LUN "0" and directs copies of the WRITE requests to the second mass-storage device 810 via an output buffer 816 stored within cache memory 818 of the mass-storage device 802. The WRITE requests directed to the dominant LUN, and to other LUNS or volumes provided by the first mass-storage device, are also directed to an input buffer 820 from which the WRITE requests are subsequently extracted and executed to store data on physical data-storage devices 822 within the first mass-storage device. Similarly, the duplicate WRITE-requests transmitted by the first mass-storage device through the ESCON, ATM, FC, T3, or other type of link or links 812 are directed by the controller 824 of the second mass-storage device 810 to an input buffer 826 within a cache-memory 822 of the second mass-storage device for eventual execution and storage of data on the physical data-storage devices 830 within the second mass-storage device 810.

In general, the output buffer 816 within the first mass-storage device is used both as a transmission queue as well as a storage buffer for holding already transmitted WRITE requests until an acknowledgment for the already transmitted WRITE requests is received from the second mass-storage device. Thus, for example, in FIG. 8A, the next WRITE-request to be transmitted 832 appears in the middle of the output buffer, above already transmitted WRITE requests 834–839. When an acknowledgement for a transmitted WRITE request is received from the second mass-storage device, the output buffer 818 entry corresponding to the acknowledged, transmitted WRITE request can be overwritten by a new incoming WRITE request. In general, output buffers are implemented as circular queues with dynamic head and tail pointers. Also note that, in FIGS. 8A–C, and in the subsequent, related figures identified above, the cache memory buffers are shown to be rather small, containing only a handful of messages. In actual mass-storage devices, by contrast, electronic cache memories may provide as much as 64 gigabytes of data storage. Therefore, output and storage buffers within mass-storage-device cache memories are often extremely large. The illustration conventions employed in FIGS. 8A–C, and in the subsequent, related figures identified above, present simple examples, and are not intended to, in any way, define the sizes, capacities, and other parameters of actual mass-storage-device and communications-link components.

Although the communications link 812 employs lower-level protocols with message retry, the communications link may nonetheless fail, from time to time, to deliver a message. FIG. 8B illustrates a system state, subsequent to that shown in FIG. 8A, in which the 94$^{th}$ WRITE request, directed from the first mass-storage device 802 to the second mass-storage device 810, has failed to be transmitted to the second mass-storage device 810. The controller 824 of the second mass-storage device 810 reserves a place 840 within the input queue 826 for the 94$^{th}$ WRITE request, and continues to accept higher-sequence-number WRITE requests, buffering them in the input buffer 826. The controller 824 may not apply the higher-sequence-number WRITE requests before applying the missing 94$^{th}$ WRITE request, for reasons to be discussed, in detail, below. In general, WRITE requests may only be applied in-order, to ensure a consistent database. The second mass-storage device 810 has only a finite amount of storage space for buffering WRITE requests, and so must eventually detect and deal with a missing WRITE request, such as the missing 94$^{th}$ WRITE request in the example shown in FIG. 8B.

Handling of missing WRITE requests, currently, is facilitated by timing mechanisms based on a system timer accessible to the controller of a mass-storage device. There are many timing mechanisms. In the most common mechanism, incoming WRITE requests are time stamped relative to the system timer, represented in FIG. 8C as a small clock-like object 843. The controller can determine, for any buffered WRITE request, the amount of time elapsed since the WRITE request was received from the communications link 812. FIG. 8C illustrates the commonly employed mechanism for handling missing WRITE requests. In FIG. 8C, the controller 824 of the second mass-storage device 810 has determined that the least-recently received WRITE request 842 was received more than some threshold amount of time before the current time. In other words, one can think of the least-recently-received WRITE request 842 as having set a timer that has expired after a threshold amount of time. The timer is expired because the missing 94$^{th}$ WRITE request has not been received.

Upon expiration of the timer, the controller purges the input buffer 826 to make room for additional incoming messages, for example, from host computer 844 directed to volumes or LUNs other than the remote-mirror LUN paired with the dominant LUN of the first mass-storage device 802. Rather than simply discarding the stored WRITE requests, the second mass-storage-device controller may intelligently purge only those WRITE-requests directed to the remote-mirror LUN, allocating a bit map 846 to store one-bit entries for each purged WRITE request to keep track of the logical blocks, sectors, or other data-storage units to which the WRITE-requests were directed. In other words, the bit map 846 contains a record of all block or sectors that would have been overwritten by the WRITE requests had the timer now expired. Purging of the input buffer, indicated by arrow 848, may also be accompanied by subsequent storage of indications 850 of received WRITE requests within the bit map 846. Finally, the controller of the second mass-storage device directs a high-level failure message 852 back to the first mass-storage device.

Figure 9B:
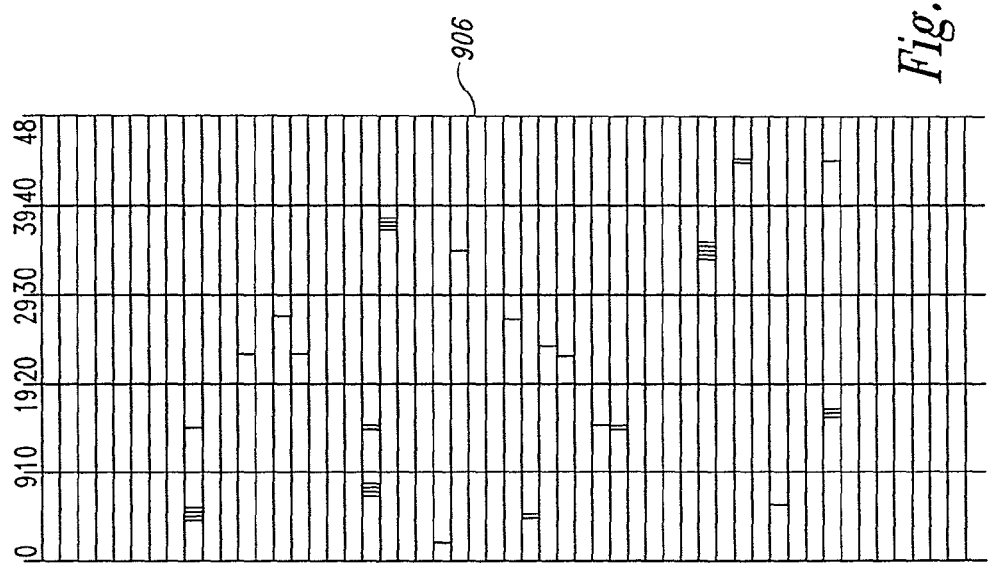
FIGS. 9A and 9B illustrate a normal WRITE-request buffer, such as the input queue 826 of the second mass-storage device in FIG. 8C, and a bit-map buffer, such as the bit map 846 in FIG. 8C.
Figure 9A:
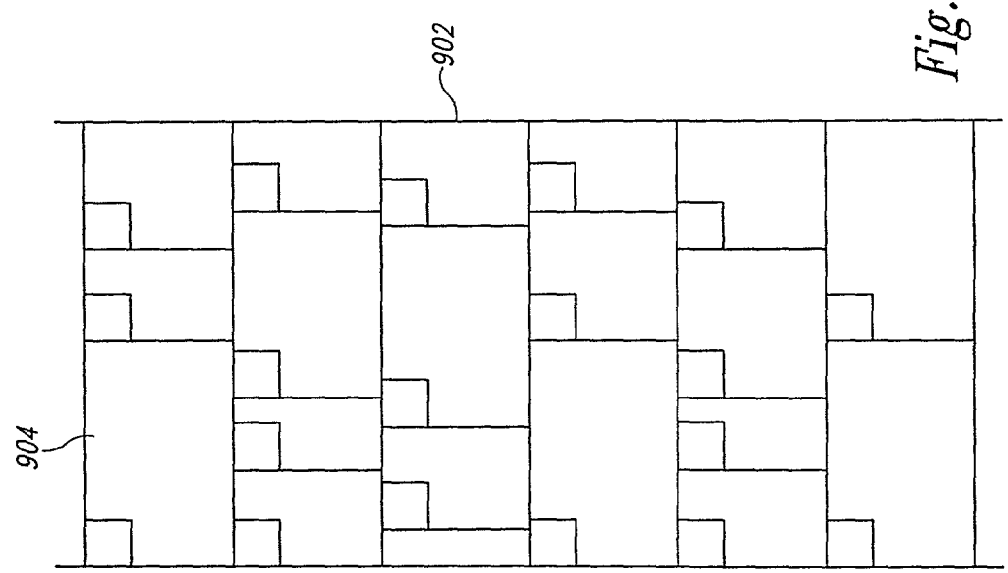

FIGS. 9A and 9B illustrate a normal WRITE-request buffer 902, such as the input queue 826 of the second mass-storage device in FIG. 8C, and a bit-map buffer 906, such as the bit map 846 in FIG. 8C. Initially, a controller may buffer WRITE requests in a time-ordered WRITE-request buffer, illustrated in FIG. 9A. In the time-ordered WRITE-request buffer 902, WRITE requests are stored in their sequence order. Unfortunately, the amount of data that can be stored within the time-ordered WRITE-request buffer 902 is limited, and each WRITE request, such as WRITE request 904, must be stored in its entirety. The advantage of using a time-ordered WRITE-request buffer is that, upon resumption of dequeing and execution of WRITE requests from the WRITE-request buffer, WRITE requests can be straightforwardly extracted from the sequence-ordered WRITE-request buffer and applied to physical data-storage devices.

If a missing WRITE request is not retransmitted and successfully received by the second mass-storage device, the controller of the mass-storage device may detect a timer expiration related to the missing WRITE request, and purge WRITE requests in the input buffer 826 into the bit map 846. In a WRITE-request bit-map buffer, each of the data storage units within the remote-mirror LUN is represented within the WRITE-request bit-map buffer as a single bit. When the bit is set, the bit map indicates that that a WRITE request has been received since the controller stopped dequeing and executing WRITE requests from the input buffer 826. Generally, either tracks or cylinders are employed as the logical data storage unit to represent with a single bit within the bit map, in order to keep the bit map reasonably sized.

The WRITE-request bit-map buffer 906 is far more compact than a sequence-ordered WRITE-request buffer. Rather than storing the entire WRITE-request, including the data to be written, the WRITE-request bit-map buffer needs to maintain only a single bit for each track or cylinder to indicate whether or not a WRITE request directed to the track or cylinder has been received. Unfortunately, the WRITE-request bit-map buffer does not maintain any WRITE-request sequence information. Thus, once communications is resynchronized between the mass-storage devices, the bit map can only be used to request retransmission of data initially transmitted in WRITE requests that were purged from cache memory or received by the second mass-storage device after the purge.

Figure 10A:
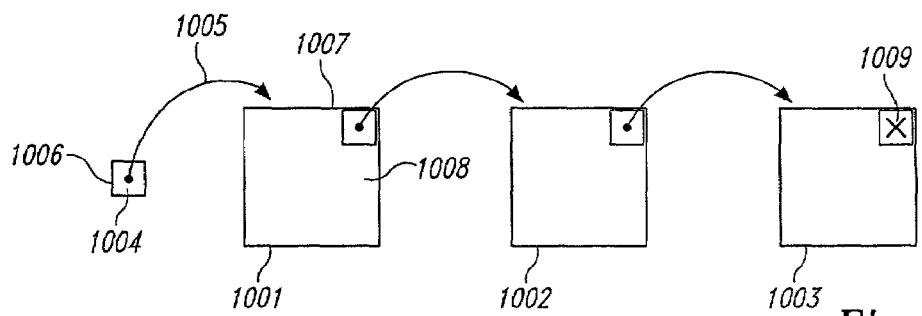
FIGS. 10A–E illustrates an example of a detrimental, out-of-order WRITE request applied to a mass-storage device.

FIGS. 10A–E illustrate an example of a detrimental out-of-order WRITE request applied to a mass-storage device. The example of FIGS. 10A–E involves a simple linked list. FIG. 10A is an abstract illustration of a general, linked-list data structure. The data structure comprises three nodes, or data blocks 1001–1003. A linked list may contain zero or more data blocks, up to some maximum number of data blocks that can be stored in the memory of a particular computer. Generally, a separate pointer 1004 contains the address of the first node of the linked list. In FIGS. 10A–E, a pointer, or address, is represented by an arrow, such as arrow 1005, pointing to the node to which the address refers, and emanating from a memory location, such as memory location 1006, in which the pointer is stored. Each node of the linked list includes a pointer and other data stored within the node. For example, node 1001 includes pointer 1007 that references node 1002 as well as additional space 1008 that may contain various amounts of data represented in various different formats. Linked lists are commonly employed to maintain, in memory, ordered sets of data records that may grow and contract dynamically during execution of a program. Linked lists are also employed to represent ordered records within the data stored on a mass-storage device. Note that the final node 1003 in the linked list of FIG. 10A includes a null pointer 1009, indicating that this node is the final node in the linked list.

Figure 10B:
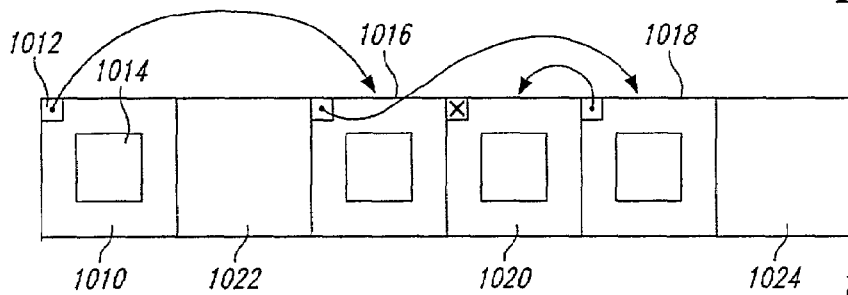

FIGS. 10B–E abstractly represent data blocks, stored on a mass-storage device, that contain a linked list of data blocks. Each data-block node, such as data-block node 1010, includes a pointer, such as pointer 1012, and some amount of stored data, such as stored data 1014. The list of data blocks in FIG. 10B starts with node 1010, next includes node 1016, then node 1018, and, finally, node 1020. Each data block can be written or overwritten, in a single mass-storage-device access. Data blocks 1022 and 1024 in FIG. 10B are unused.

Figure 10C:
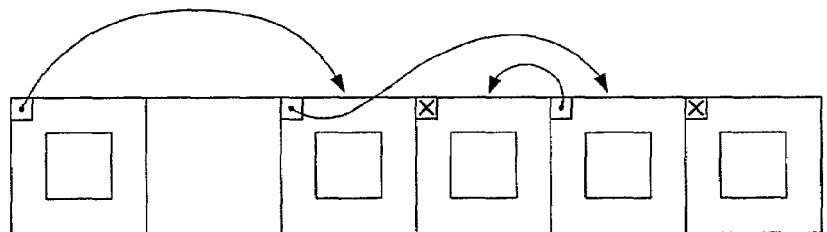
Figure 10D:
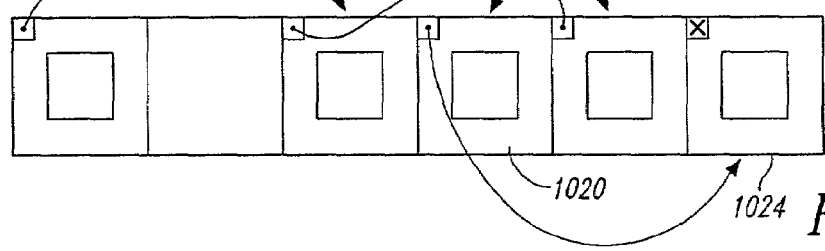
Figure 10E:
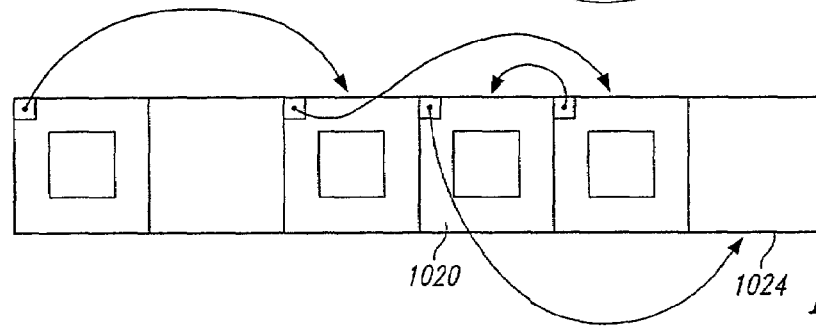

Consider the addition of a new node, or data block, to the end of the linked list. The two WRITE operations required to add a data block to the end of the list are illustrated in FIGS. 10C–D. First, the new node is written to data block 1024, as shown in FIG. 10C. Then, node 1020 is overwritten in order to change the pointer within node 1020 to reference the newly added node 1024. When these operations are performed in the sequence shown in FIGS. 10C–D, the linked list is consistent at each point in the two-WRITE-request operation. For example, in FIG. 10C, the new node has been added, but is not yet a member of the linked list. If the second operation, illustrated in FIG. 10D, fails, the linked list remains intact, with the only deleterious effect being an overwritten, and possibly wasted, data block 1024. In the second operation, illustrated in FIG. 10D, the pointer within data node 1020 is updated to point to already resident node 1024, leaving the linked list intact and consistent, and having a new node.

Consider, by contrast, the state of the linked list should the second WRITE operation, illustrated in FIG. 10D, occur prior to the first WRITE operation, illustrated in FIG. 10C. In this case, illustrated in FIG. 10E, the pointer within node 1020 references data block 1024. However, data block 1024 has not been written, and is therefore not formatted to contain a pointer having a null value. If, at this point, the second WRITE operation fails, the linked list is corrupted. A software routine traversing the nodes of the linked list cannot determine where the list ends. Moreover, the software routine will generally interpret any data found in data block 1024 as the contents of the fifth node of the linked list, possibly leading to further data corruption. Thus, the order of WRITE operations for adding a node to a linked list stored on a mass-storage device is critical in the case that all WRITE operations are not successfully carried out. When WRITE requests are extracted from a time-ordered WRITE-request buffer, as shown in FIG. 9A, and executed on a remote-mirror, the remote-mirror will remain in a data-consistent state throughout the period time during which the buffered WRITE requests are carried out, providing that the order in which the WRITE requests were transmitted to the mass-storage device is consistent. However, when data in tracks or cylinders flagged in a WRITE-request bit-map buffer of FIG. 9B are requested to be retransmitted from the first mass-storage device, and are sent in an arbitrary order to the second mass-storage device, the data state of the remote-mirror LUN may be quite inconsistent, and potentially corrupted, until all tracks or cylinders flagged within the WRITE-request bit-map buffer are successfully retransmitted and applied to the remote-mirror LUN. The corruption illustrated in FIGS. 10A–E is rather straightforward and simple. The potential corruption within hundreds of gigabytes of data stored within a mass-storage-device LUN and incompletely transferred, out-of-order, to a remote LUN is staggering. Literally hundreds of thousands of complex data interrelationships may be irreparably broken.

Figure 11:
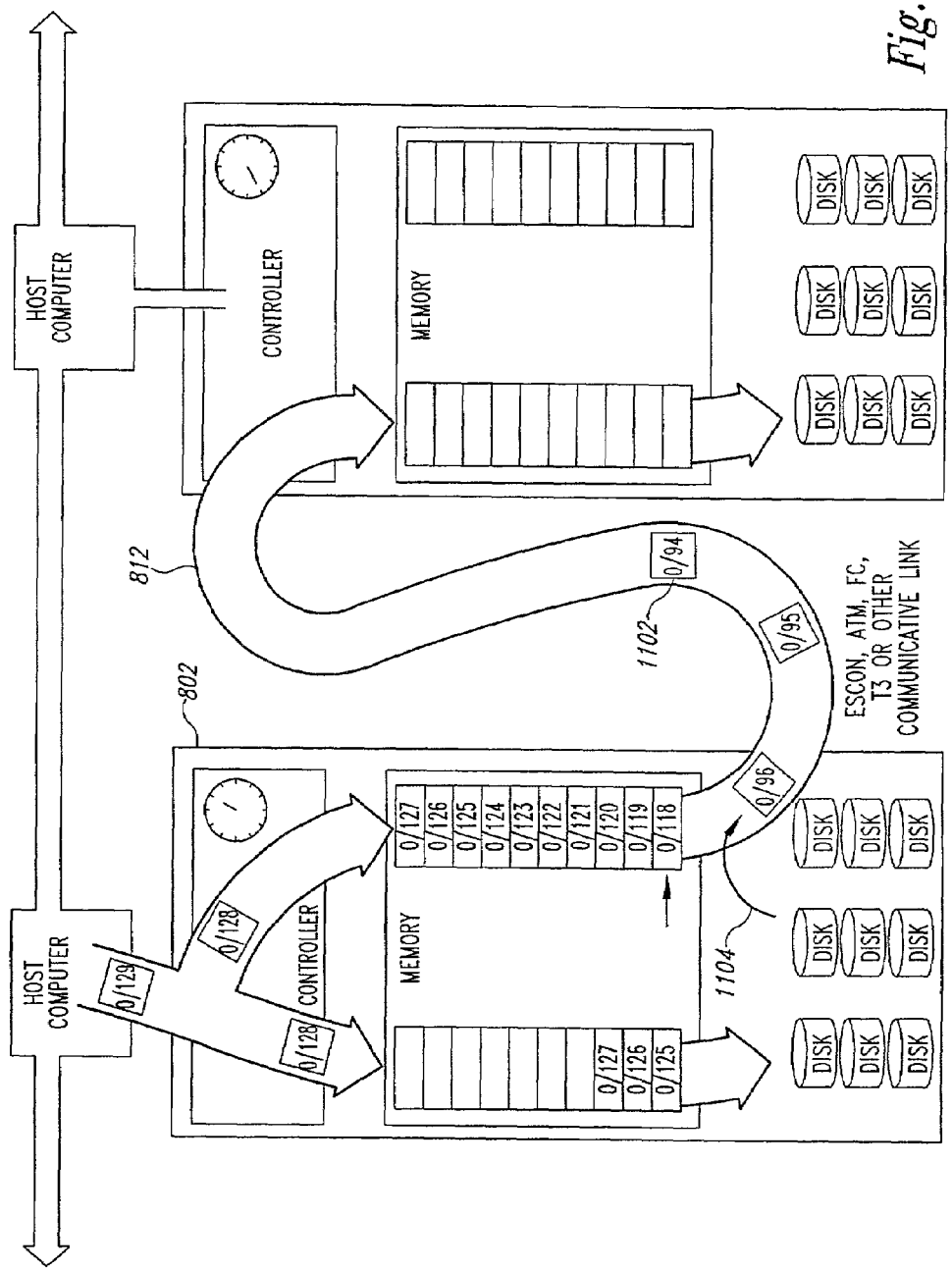
FIG. 11 shows the final stage in recovery from the missing WRITE request problem illustrated in FIG. 8A–C.

FIG. 11 shows the final stage in recovery from the missing-WRITE-request problem illustrated in FIG. 8A–C. After sending a message by the controller of the second mass-storage device to the first mass-storage device 802 to indicate expiration of the timer and loss of the $94^{th}$ WRITE request, the two mass-storage devices carry out a communications-failure-recovery protocol, part of which comprises sending the bit map (846 in FIG. 8C) from the second mass-storage device to the first mass-storage device to indicate to the first mass-storage device those blocks, or sectors, within the remote-mirror LUN that were not updated according to transmitted WRITE requests. The second mass-storage device uses the bit map and any other returned information to restart transmission of already transmitted data from the first mass-storage device to the second mass-storage device. For example, in FIG. 11, the $94^{th}$ WRITE request that was not previously successfully transmitted 1102 is retransmitted by the first mass-storage device to the second mass-storage device via communications link 812. The first mass-storage device may read the indicated blocks, or sectors, from its own physical data-storage devices, as indicated by arrow 1104 in FIG. 11, in order to reconstruct the WRITE requests for retransmission to the first mass-storage device. However, as discussed above, until the remote-mirror LUN reaches the same data state as that of the dominant LUN, the remote-mirror LUN may be in an inconsistent state.

Figure 12A:
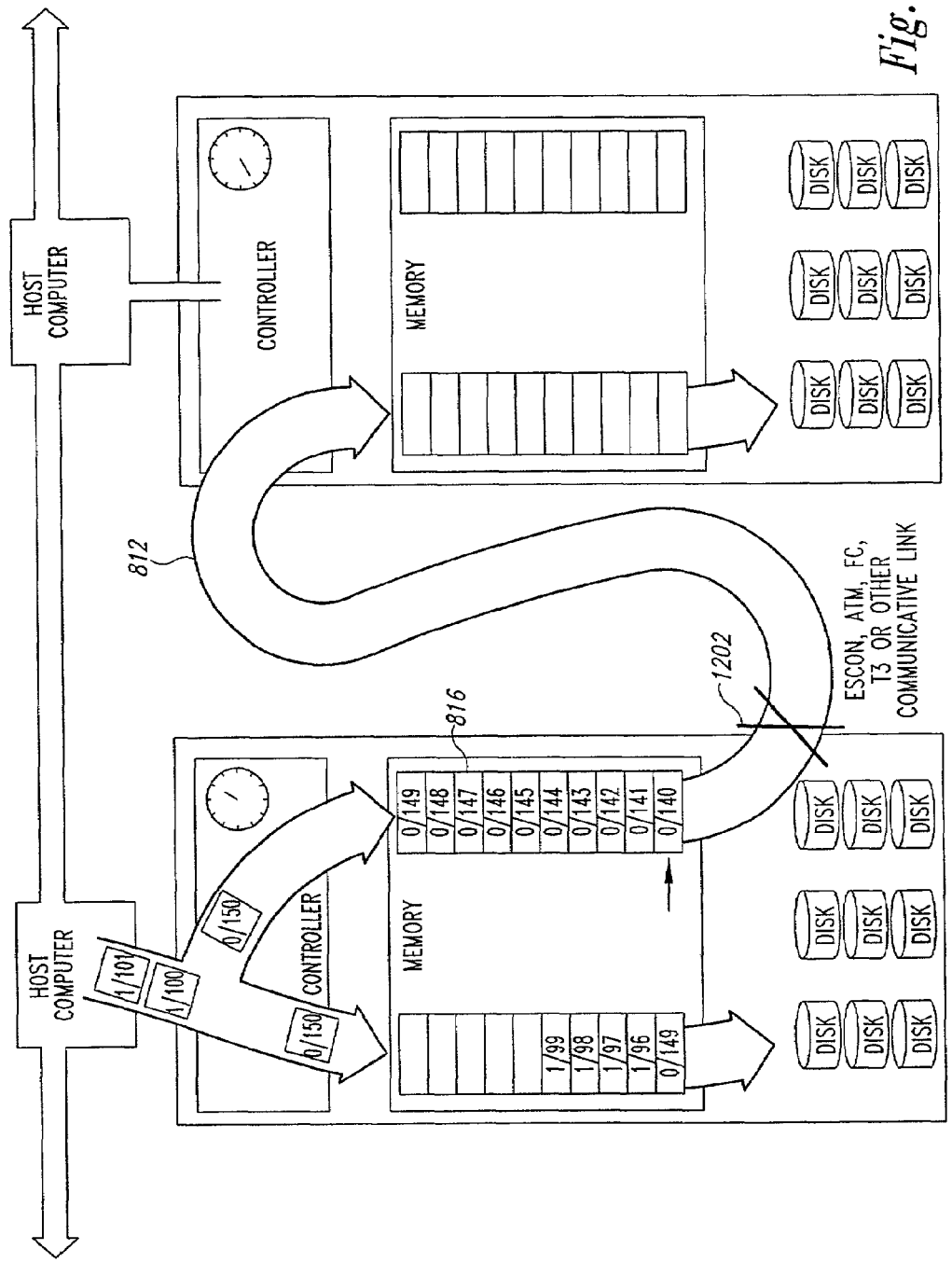
Figure 12B:
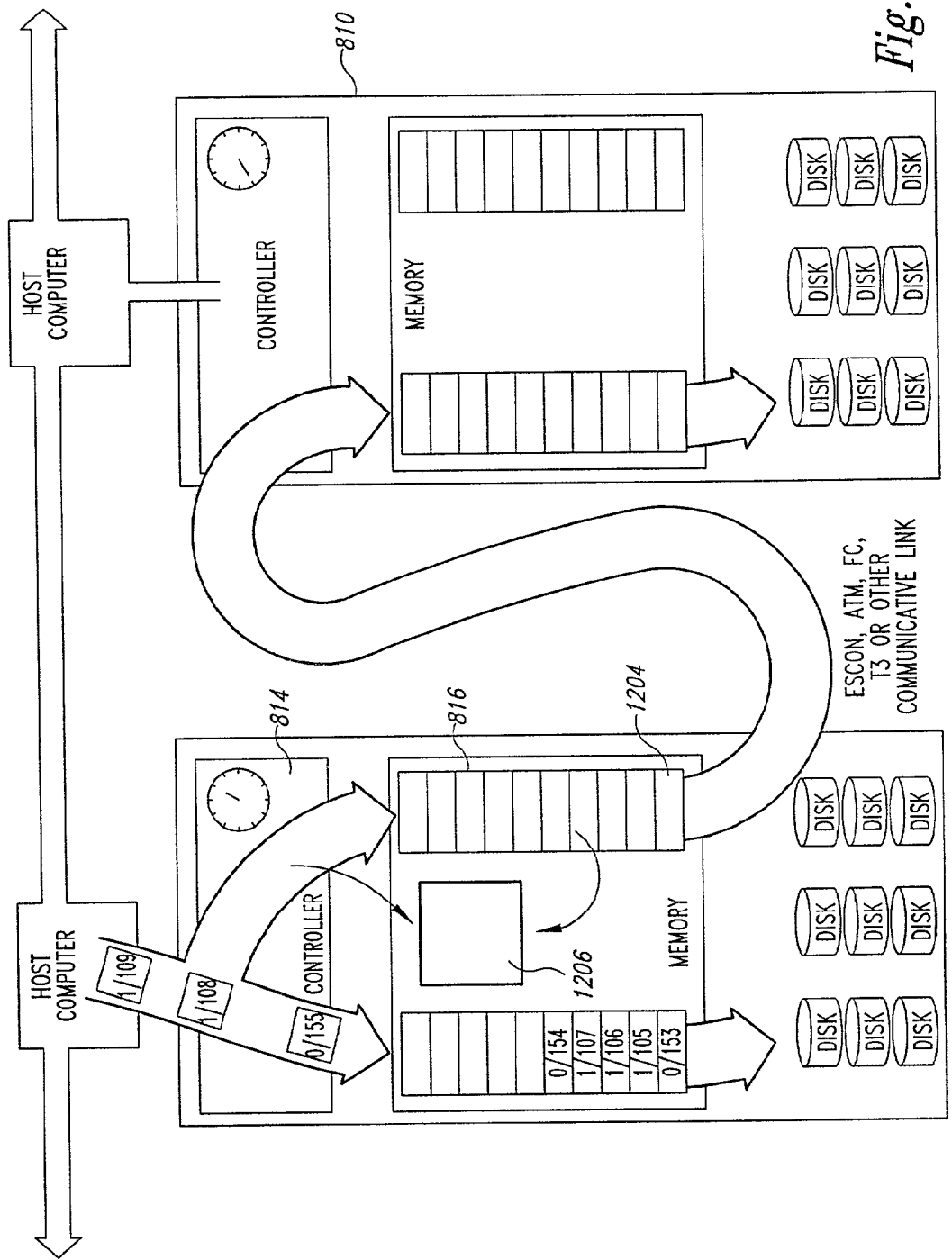

The first mass-storage device may employ a similar error-recovery mechanism in the event of a failure in direct the communications link (812 in FIG. 11) between the first mass-storage device to the second mass-storage device. FIGS. 12A–C illustrate the error-recovery technique employed to handle communications-link failures. In FIG. 12A, the communications link 812 is disrupted, as indicated by the large "X" 1202 overlying the communications link 812. In this case, as shown in FIG. 12A, WRITE-requests, duplicated for transmission to the remote-mirror LUN, begin to accumulate in the output buffer 816. At a subsequent point in time, as shown in FIG. 12B, either an internal timer expires for the least recently duplicated WRITE requests 1204 or the output buffer 816 becomes completely filled. The controller 814 of the first mass-storage device detects either or both these conditions, and purges the output buffer 816, storing in a bit map 1206 binary indications of those remote-mirror LUN blocks or sectors that would have been written had the purged WRITE requests been successfully transmitted to the second mass-storage device 810. Later, when the communications-link 812 is restored to functioning order, the controller 814 of the first mass-storage device 802 can employ the bit map 1206 to retrieve the data of those blocks or sectors that should have been transmitted to the remote-mirror LUN, and regenerate corresponding unordered WRITE requests, representing the logical OR of the combined local and remote array bitmaps, that are placed into output buffer 816 for retransmission to the second mass-storage device.

Figure 13:
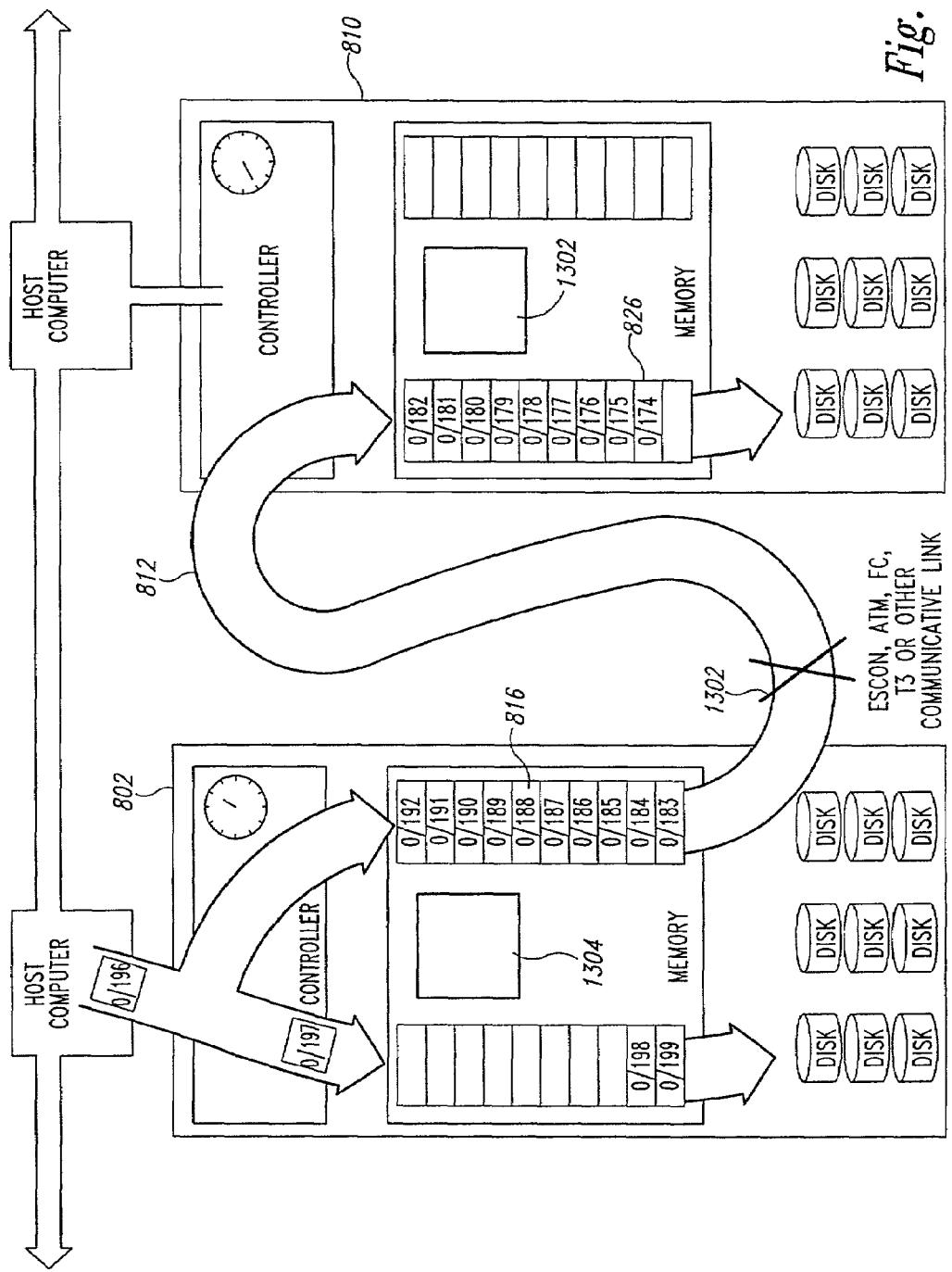
FIGS. 13 and 14 illustrate the occurrence of multiple failures, leading to data loss within the mass-storage devices of FIGS. 8A–C, 11, and 12A–C.
Figure 14:
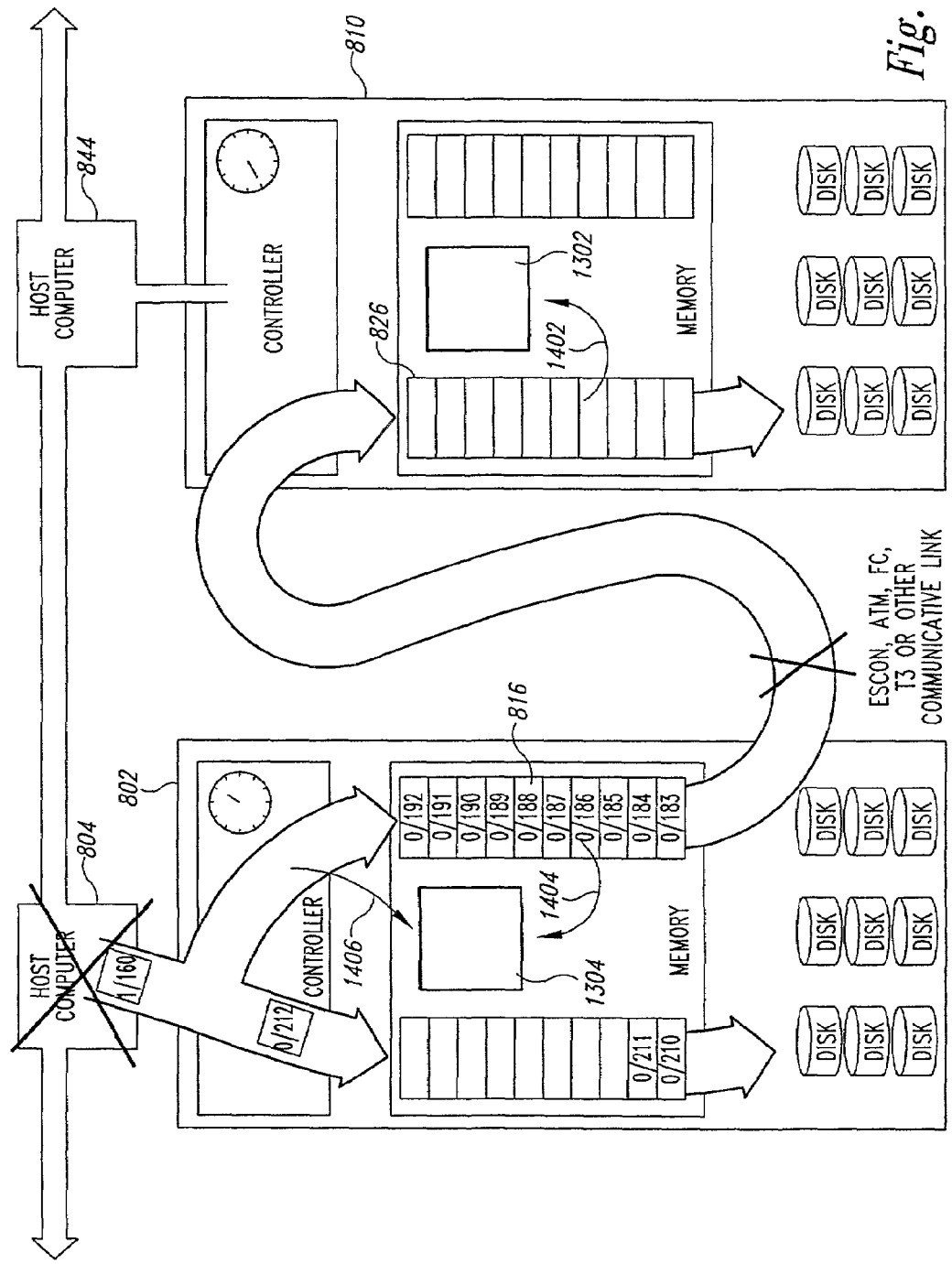

The two techniques illustrated in FIGS. 8A–C, 11, and FIGS. 12A–C can be used to recover from problems associated with single communications-link failures by both the mass-storage device containing the remote-mirror LUN as well as the mass-storage device containing the dominant LUN. However, multiple failures do, from time-to-time, occur. FIGS. 13 and 14 illustrate the occurrence of multiple failures, leading to data loss within the mass-storage devices of FIGS. 8A–C, 11, and 12A–C. In FIG. 13, a WRITE request transmitted by the first mass-storage device 802, WRITE request "0/173," is not received by the second mass-storage device 810, leading to buffering of a large number of subsequently received WRITE requests by the controller of the second mass storage device in input buffer 826. Eventually, a timer expires, leading to allocation of a bit map 1302 for storing information about out-of-date blocks, or sectors, as a result of purging the WRITE requests from the input buffer 826.

In the same time frame, the communications link 812 completely fails, as indicated by the "X" 1302 superimposed on the communications link. This leads to accumulation of duplicated WRITE requests in the output buffer 816 of the first mass-storage device 802. Finally, the controller of the first mass-storage device detects the communications failure and allocates a bit map 1304 for storing information about the remote-mirror LUN blocks, or sectors, that would have been written by the WRITE requests that the controller then purges from the output buffer 816. As shown in FIG. 14, the controller of the second mass-storage device directs purging 1402 of the input buffer 826, storing out-of-date-block, or out-of-date-sector, information in the allocated bit map 1302. Concurrently, the first mass-storage device controller directs purging 1404 of the output buffer 816, storing indications of remote-mirror-LUN out-of-date blocks, or out-of-date sectors, also known as orphaned blocks or sectors, in bit map 1304. In addition, newly duplicated WRITE-requests 1406 are discarded, after making appropriate entries in the bit map 1304.

Next, the host computer 804 fails. Failure of the host computer 804 leads to fail over of the dominant-LUN/remote-mirror-LUN pair to the remote-mirror LUN stored within the second mass-storage device 810. In other words, the first mass-storage device is no longer accessible to system users via host computer 804, and system fail over occurs, with re-direction of READ and WRITE requests to the remote-mirror LUN via host computer 844. However, the remote-mirror LUN is not up-to-date, having not been updated by the WRITE requests purged from the input buffer 826 in the second mass-storage device, nor updated by the WRITE requests purged from the output buffer 816 in the first mass-storage device 802. More seriously, the remote-mirror LUN may be inconsistent, due to communications-link failure in the middle of a multi-WRITE-request transactions. But the out-of-date, and perhaps inconsistent, remote-mirror LUN now becomes the dominant LUN, and the second mass-storage device begins accepting WRITE requests directed to the new dominant LUN via host computer 844. If the remote-mirror LUN was not inconsistent prior to accepting new WRITE requests, it may now quickly become so, since many intervening WRITE requests purged from the input buffer 826 and output buffer 816 have been lost. Thus, because of multiple failures, neither the dominant LUN nor the remote-mirror LUN may be consistent following fail over, and it may be subsequently impossible to recover a consistent data base date.

Thus, as seen in the above-described examples, communications-link failures may lead to purging of input and output buffers in both mass-storage devices involved in a dominant-LUN/remote-mirror-LUN pair. This purging of WRITE requests may represent a significant loss of transmitted data. When a second failure occurs, such as the failure of the host computer associated with the first mass-storage device, a large amount of data may be completely lost, and both the dominant LUN and remote-mirror-LUN may quickly end up in inconsistent states without any possibility of recovery.

Figure 15:
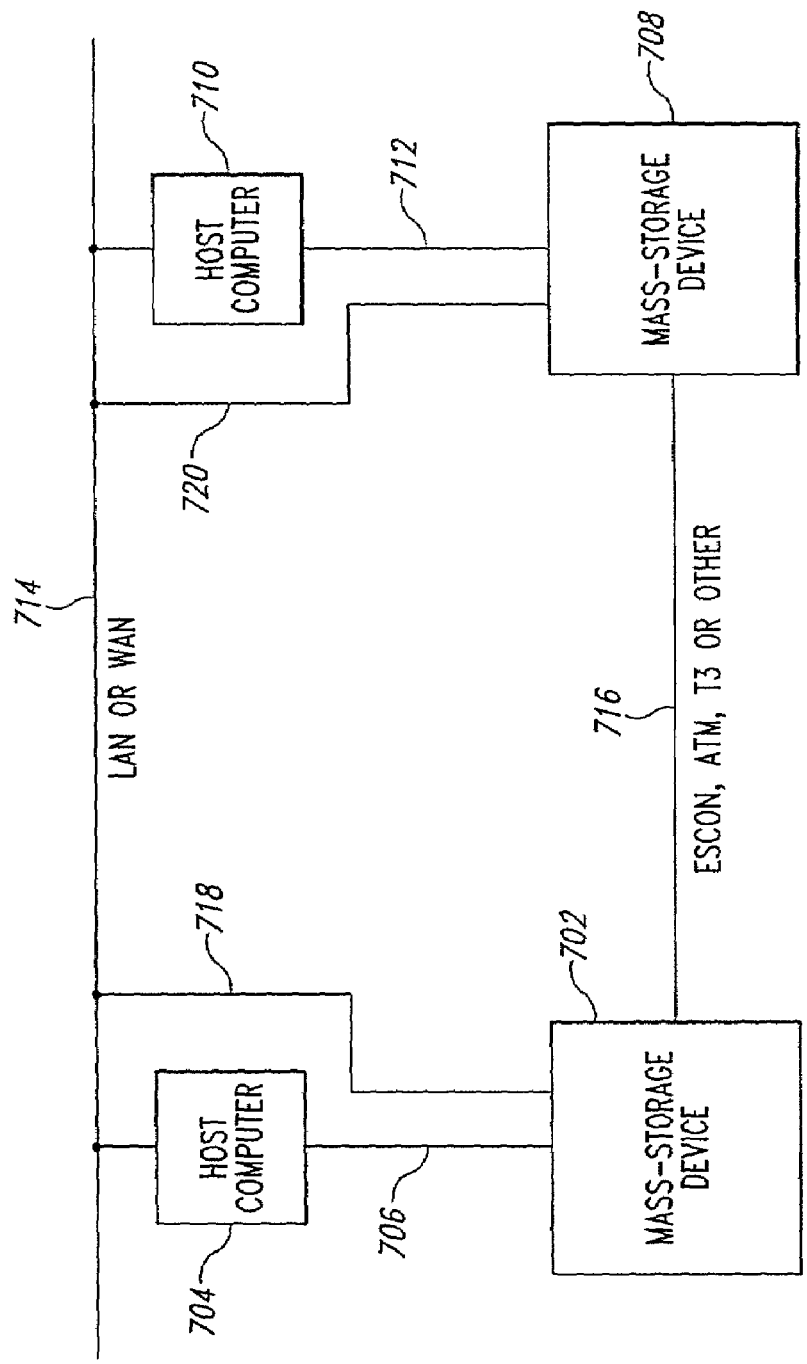
FIG. 15 illustrates an enhanced communications topology that represents a portion of one embodiment of the present invention.

One embodiment of the present invention greatly lessens the chance of purging of cached data by either or both mass-storage devices of a dominant-LUN/remote-mirror-LUN pair, and therefore greatly lessens the chance that cached data is lost as a result of multiple failures. FIG. 15 illustrates an enhanced communications topology that represents a portion of one embodiment of the present invention. FIG. 15 uses the same illustration conventions as used in FIG. 7, and uses the same numerical labels. Note that, in the communications topology shown in FIG. 15, direct connections 718 and 720 have been added to directly connect the first mass-storage device 702 and the second mass-storage device 708 to the LAN/WAN 714. In certain systems, such direct links may already be present, but are used only system management functions, and not for transferring data to and from physical storage. Should the ESCON, ATM, T3 link or links 716 that directly interconnect the first mass-storage device 702 with the second mass-storage device 708 fail, WRITE requests can nonetheless be forwarded from the first mass-storage device to the second mass-storage device via interconnects 718 and 720 and the LAN/WAN 714. In other words, the mass-storage devices do not depend on their associated host computers for interconnection with the LAN/WAN. Not only do connections 718 and 720 provide an alternate communications link between the two mass-storage devices, they provide an entirely different type of communications link that may survive failure of direct links.

The enhanced communications topology, illustrated in FIG. 15, along with an enhanced mass-storage-device-controller communications protocol, prevents the cache purging and data loss illustrated in the examples of FIGS. 8A–C, and 11–14. FIGS. 16A–D show, using the same illustration conventions used in FIGS. 8A–C, 11, 12A–C, 13, and 14, operation of the exemplary mass-storage devices using the techniques provided by one embodiment of the present invention. Note that, in FIG. 16A, a second timer 1602, or subtimer, is shown within the controller 824 of the second mass-storage device 810. The timer 1602 shown in FIG. 16A, like the original timer, is meant to represent a combination of a system clock and time stamps within received WRITE requests. Alternative timing mechanisms are also possible. Operation of the subtimer is illustrated in the example discussed below.

Figure 16A:
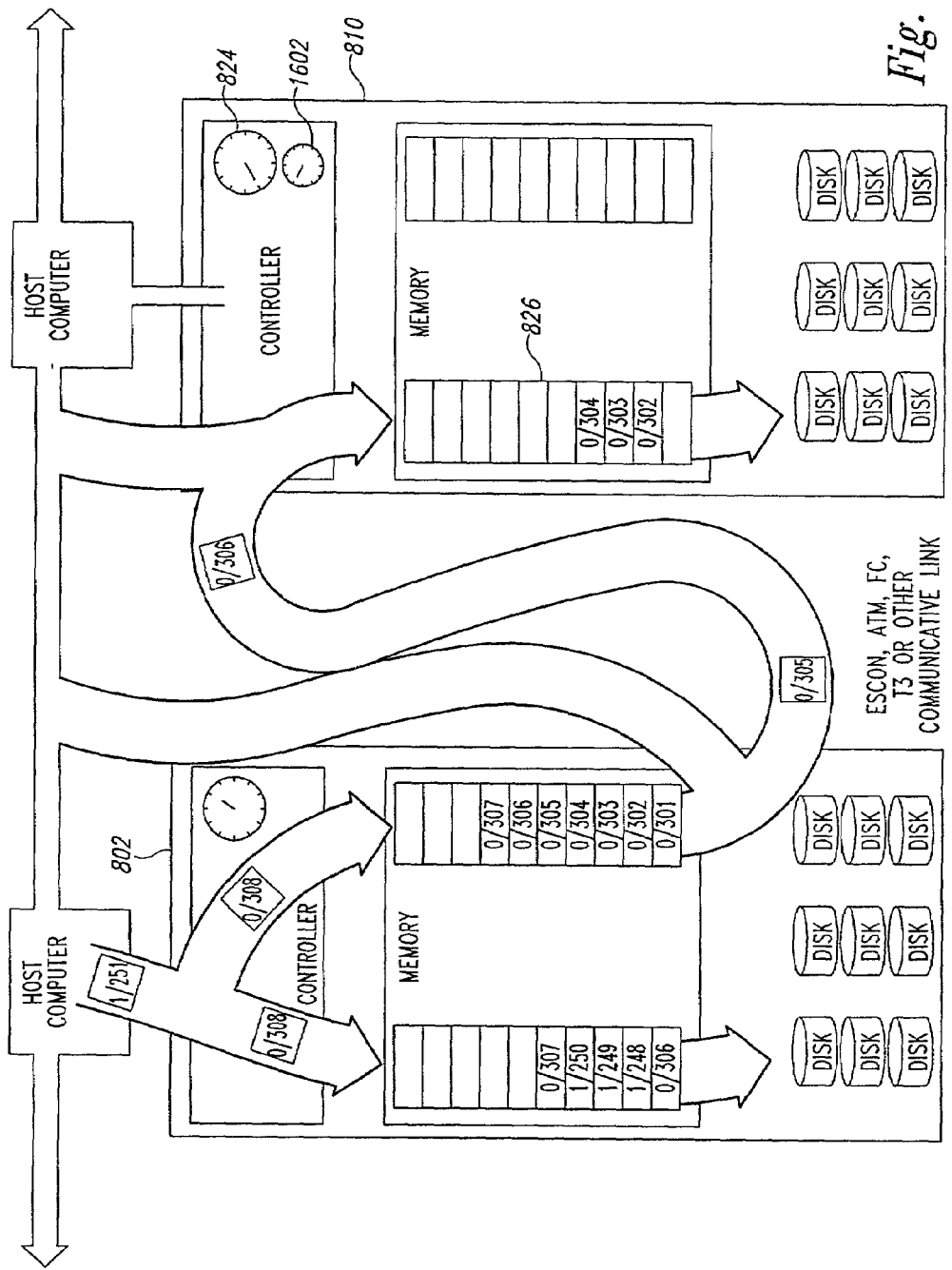
FIGS. 16A–D illustrates operation of the exemplary mass-storage devices using the techniques provided by one embodiment of the present invention.
Figure 16B:
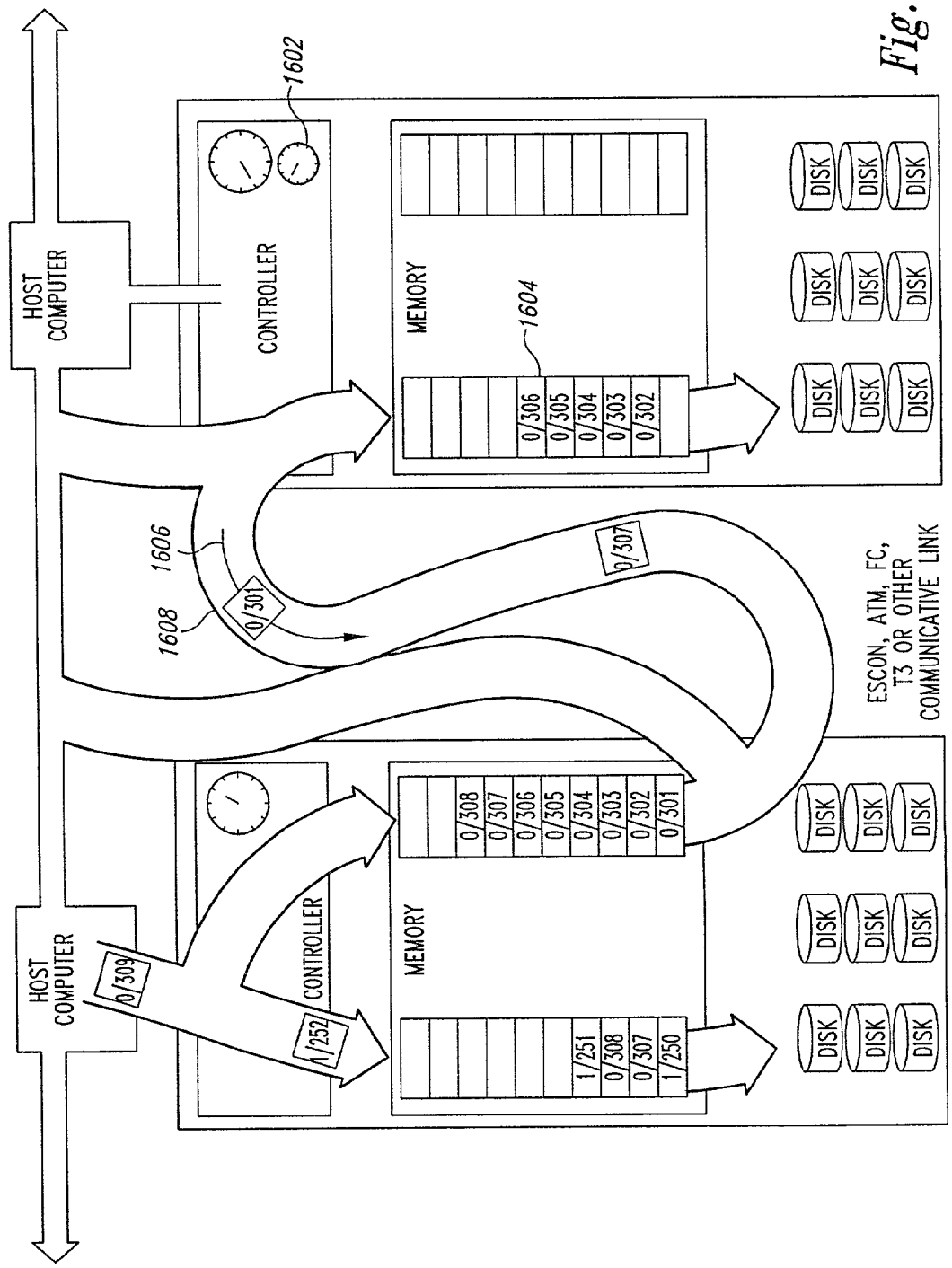
Figure 16C:
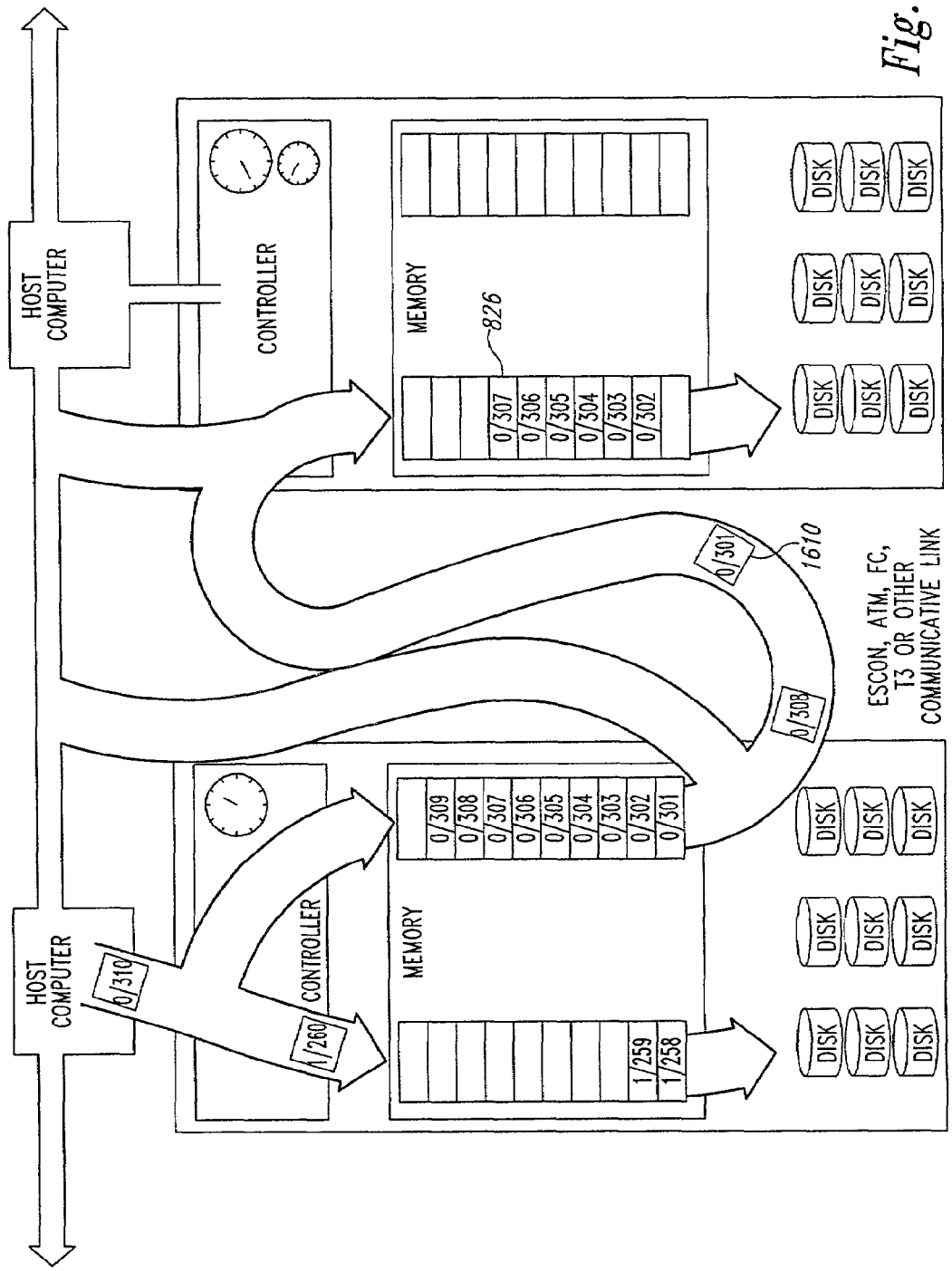

In FIG. 16A, WRITE requests continue to be forwarded by the first mass-storage device 802 to the second mass-storage device 810, as in FIGS. 8A–C. In FIG. 16A, a WRITE request directed to the second mass-storage device, WRITE Request "0/301," has failed to arrive at the second mass-storage device due to an error within the communications link, or in communications-link-related drivers or protocol engines, within the first, second, or both mass-storage devices. As before, the second mass-storage device continues to accumulate higher-sequence-number WRITE requests in the input buffer 826, hoping that the missing WRITE request "0/301" will eventually be received. However, as shown in FIG. 16B, at a point in time when the subtimer 1602 for the missing WRITE request, or the next highest-sequence-numbered request 1604, expires, the controller of the second mass-storage device sends 1606 a high-level, mass-storage-device-protocol message 1608 back to the first mass-storage device to request that the first mass-storage device re-send the missing WRITE request. In other words, in one embodiment of the present invention, a higher-level, mass-storage-device-level protocol enhances the lower-level communications-link protocols to ensure that a missing WRITE request is detected, and re-transmission requested, before the main timer expires, initiating the bit map and cache purge operations discussed previously with respect to FIG. 11. As shown in FIG. 16C, the request for re-transmission (1608 in FIG. 16B) is received by the first mass-storage device, eliciting re-transmission of the missing WRITE request 1610. Thus, the cache-purge-and-bit-map failure recovery discussed, above, with reference to FIGS. 8A–C and 11, is avoided. The high-level-protocol enhancement to the mass-storage device controllers prevents build-up of unexecuted WRITE requests in the input buffer 826 of the second mass-storage device.

Figure 16D:
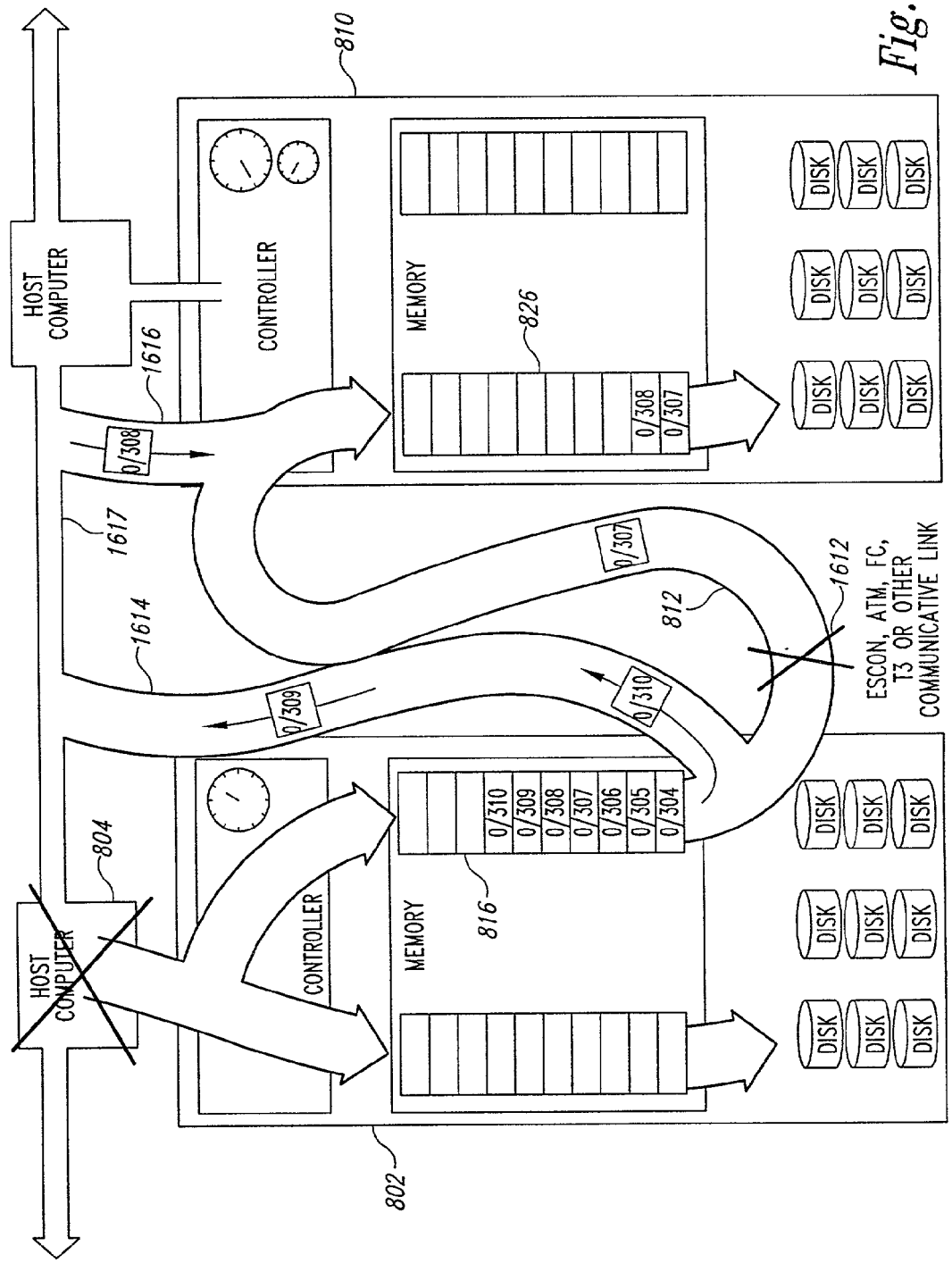

FIG. 16D illustrates the multiple failure scenario first illustrated in FIG. 14, in a two-mass-storage device system employing the techniques of the present invention. In the scenario, the communications link 812 has failed 1612 and the host computer 804 has also failed. Thus, fail over to the remote-mirror LUN provided by the second mass-storage device is imminent. Note, however, that the input buffer 826 of the second mass-storage device 810 is not backed-up due to missing WRITE requests, and that the remote-mirror LUN is not therefore out-of-date because of cached, but not executed, WRITE requests. Moreover, the direct connections 1614 and 1616 of the first mass-storage device 802 and the second mass-storage device 810 allow for transmission of WRITE requests stored in the output buffer 816 of the first mass-storage device 802 to be transmitted, or flushed, through the LAN/WAN 1617 to the second mass-storage device. Thus, the data state of the remote-mirror-LUN can be synchronized with that of the dominant LUN contained in the first mass-storage 802 prior to fail over. In this way, the remote-mirror-LUN can be brought to a data-consistent state without loss of WRITE requests due to cache purges or orphaned WRITE requests within an isolated first mass-storage device.

Although the present invention has been described in terms of a particular embodiment, it is not intended that the invention be limited to this embodiment. Modifications within the spirit of the invention will be apparent to those skilled in the art. For example, a second, direct mass-storage-device-to-mass-storage device communications link can be provided in any number of different ways, and is not restricted to a LAN/WAN interconnection, as disclosed in the above embodiment. The high-level mass-storage-device-protocol enhancement described above, can be carried out in any of many different levels within the mass-storage-device controller, and may be embodied in logic circuits, firmware, or controller software. Many different types of mass-storage devices can employ the present invention, including disk arrays.

The foregoing description, for purposes of explanation used specific nomenclature to provide a thorough understanding of the invention. However, it will be apparent to one skilled in the art that the specific details are not required in order to practice the invention. In other instances, well-known portions of disk arrays are shown as diagrams in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments are shown and described in order to best enable others skilled in the art to best utilize the invention and various embodiments with various modifications as are suited to the particular use contemplated. It is intended that the scope of the invention be defined by the following claims and their equivalents:

The invention claimed is:

1. A reliable computing and data-storage system comprising:
   a first host computer linked to a second host computer by a first communications medium;
   a first mass-storage device, linked to the first host computer by a second communications medium;
   a second mass-storage device, linked to the second host computer by a third communications medium;
   a fourth communications medium directly linking the first mass-storage device to the second mass-storage device for transmission of sequenced data written to a dominant logical unit within the first mass-storage device to the second mass-storage device for writing to a remote-mirror logical unit;
   a first link that directly links the first mass-storage device to the first communications medium;
   a second link that directly links the second mass-storage device to the first communications medium;
   controller logic within controllers of the first and second mass-storage devices, the controller logic within at least one controller detecting a failure of the fourth communications medium, the controller logic within both controllers cooperating to retransmit any lost data from the first mass-storage device to the second mass-storage device by way of the first and second links and the first communications medium.

2. The system of claim 1 wherein the first mass-storage device receives WRITE requests directed to the dominant logical unit, executes the WRITE requests with respect to the dominant logical unit, and places the WRITE requests in an output memory buffer for subsequent transmission to the second mass-storage device.

3. The system of claim 2 wherein the second mass-storage device receives WRITE requests transmitted from the first mass-storage device and stores the WRITE requests in an input memory buffer for subsequent execution with respect to the remote-mirror logical unit.

4. The system of claim 3 wherein, when the fourth communication medium fails, and WRITE requests cannot be transmitted by way of the first and second links and the first communications medium, the controller of the first mass-storage device purges WRITE requests from the output memory buffer, noting data units of the remote-mirror logical unit that would have been written by the purged WRITE requests in a bit map.

5. The system of claim 3 wherein, after the controller of the second mass-storage device detects a failure to receive a sequenced WRITE request from the first mass-storage device and requests retransmission, from the first mass-storage device, of the WRITE request that was not received by the second mass-storage device, and the WRITE request is still not received after a threshold period of time, the controller of the second mass-storage device purges WRITE requests from the input memory buffer, noting data units of the remote-mirror logical unit that would have been written by the purged WRITE requests in a bit map.

6. A reliable computing and data-storage system comprising:
a first host computer linked to a second host computer by a first communications medium;
a first mass-storage device, linked to the first host computer by a second communications medium;
a second mass-storage device, linked to the second host computer by a third communications medium;
a fourth communications medium directly linking the first mass-storage device to the second mass-storage device for transmission of sequenced data written to a dominant logical unit within the first mass-storage device to the second mass-storage device for writing to a remote-mirror logical unit;
a first link that directly links the first mass-storage device to the first communications medium;
a second link that directly links the second mass-storage device to the first communications medium; and
controller logic within controllers of the first and second mass-storage devices that detect a failure of the fourth communications medium and transmit any lost, and all subsequent, data for writing to the remote-mirror logical unit from the first mass-storage device to the second mass-storage device by way of the first and second links and the first communications medium.

7. The system of claim 6 further including:
controller logic within a controller of the second mass-storage device that detects a failure to receive sequenced data from the first mass-storage device and requests retransmission, from the first mass-storage device, of the data that was not received by the second mass-storage device.

8. The system of claim 7 wherein the first mass-storage device receives WRITE requests directed to the dominant logical unit, executes the WRITE requests with respect to the dominant logical unit, and places the WRITE requests in an output memory buffer for subsequent transmission to the second mass-storage device.

9. The system of claim 8 wherein the second mass-storage device receives WRITE requests transmitted from the first mass-storage device and stores the WRITE requests in an input memory buffer for subsequent execution with respect to the remote-mirror logical unit.

10. The system of claim 9 wherein, when the fourth communication medium fails, and WRITE requests cannot be transmitted by way of the first and second links and the first communications medium, the controller of the first mass-storage device purges WRITE requests from the output memory buffer, noting data units of the remote-mirror logical unit that would have been written by the purged WRITE requests in a bit map.

11. The system of claim 9 wherein, after the controller of the second mass-storage device detects a failure to receive a sequenced WRITE request from the first mass-storage device and requests retransmission, from the first mass-storage device, of the WRITE request that was not received by the second mass-storage device, and the WRITE request is still not received after a threshold period of time, the controller of the second mass-storage device purges WRITE requests from the input memory buffer, noting data units of the remote-mirror logical unit that would have been written by the purged WRITE requests in a bit map.

12. A method for increasing the reliability of a computing and data-storage having a first host computer linked to a second host computer by a first communications medium, a first mass-storage device, linked to the first host computer by a second communications medium, a second mass-storage device, linked to the second host computer by a third communications medium, and a fourth communications medium directly linking the first mass-storage device to the second mass-storage device for transmission of sequenced data written to a dominant logical unit within the first mass-storage device to the second mass-storage device for writing to a remote-mirror logical unit, the method comprising:
providing a first link that directly links the first mass-storage device to the first communications medium;
providing a second link that directly links the second mass-storage device to the first communications medium;
detecting, by a controller within the second mass-storage device, a failure to receive sequenced data from the first mass-storage device by the second mass-storage device and requesting retransmission, by the controller within the second mass-storage device from the first mass-storage device, of the data that was not received by the second mass-storage device; and
detecting a failure of the fourth communications medium by a controller within the first mass-storage device and transmitting any lost, and all subsequent, data for writing to the remote-mirror logical unit from the first mass-storage device to the second mass-storage device by way of the first and second links and the first communications medium.

* * * * *